United States Patent
Dyvadheenam et al.

(10) Patent No.: US 8,639,681 B1
(45) Date of Patent: Jan. 28, 2014

(54) AUTOMATIC LINK GENERATION FOR VIDEO WATCH STYLE

(75) Inventors: T A Noah Dyvadheenam, Andhra (IN); Paresh Goel, Bareilly (IN); Ayusman Sarangi, U.P. (IN); Ashish Duggal, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 830 days.

(21) Appl. No.: 11/843,461

(22) Filed: Aug. 22, 2007

(51) Int. Cl.
*G06F 17/30* (2006.01)

(52) U.S. Cl.
USPC ............ 707/707; 707/716; 707/727; 707/746

(58) Field of Classification Search
USPC .......................... 707/707, 716, 769, 727, 746
See application file for complete search history.

(56) References Cited

U.S. PATENT DOCUMENTS

| | | | |
|---|---|---|---|
| 6,556,217 B1 * | 4/2003 | Makipaa et al. | 345/667 |
| 7,353,994 B2 * | 4/2008 | Farrall et al. | 235/454 |
| 7,571,064 B2 * | 8/2009 | Moulios | 702/66 |
| 7,624,337 B2 * | 11/2009 | Sull et al. | 715/201 |
| 7,685,511 B2 * | 3/2010 | Mysore | 715/234 |
| 8,125,932 B2 * | 2/2012 | Yang | 370/260 |
| 8,370,520 B2 * | 2/2013 | Kohli et al. | 709/233 |
| 2002/0082997 A1 * | 6/2002 | Kobata et al. | 705/51 |
| 2003/0084180 A1 * | 5/2003 | Azami | 709/231 |
| 2003/0093430 A1 * | 5/2003 | Mottur | 707/10 |
| 2004/0044745 A1 * | 3/2004 | Shimizu et al. | 709/217 |
| 2004/0064416 A1 * | 4/2004 | Peled et al. | 705/51 |
| 2004/0181585 A1 * | 9/2004 | Atkinson et al. | 709/206 |
| 2005/0027687 A1 * | 2/2005 | Nowitz et al. | 707/3 |
| 2005/0071886 A1 * | 3/2005 | Deshpande | 725/135 |
| 2005/0086254 A1 * | 4/2005 | Zou et al. | 707/102 |
| 2005/0210145 A1 * | 9/2005 | Kim et al. | 709/231 |
| 2005/0228668 A1 * | 10/2005 | Wilson et al. | 704/256 |
| 2005/0262082 A1 * | 11/2005 | Kushalnagar et al. | 707/9 |
| 2006/0085732 A1 * | 4/2006 | Jiang et al. | 715/501.1 |
| 2007/0112675 A1 * | 5/2007 | Flinn | 705/50 |
| 2007/0226365 A1 * | 9/2007 | Hildreth et al. | 709/231 |
| 2008/0005126 A1 * | 1/2008 | Sankaran et al. | 707/10 |
| 2008/0208589 A1 * | 8/2008 | Cross et al. | 704/275 |
| 2008/0276100 A1 * | 11/2008 | Varone et al. | 713/190 |
| 2010/0030808 A1 * | 2/2010 | Ress et al. | 707/104.1 |

OTHER PUBLICATIONS

Berners-Lee, "Uniform Resource Identifier", (Jan. 2005),57 pgs.
"Star Wars", http://sebastianheycke.de/a_starwars/movie2.html, (Downloaded Sep. 10, 2007).

(Continued)

*Primary Examiner* — Baoquoc N To
*Assistant Examiner* — Andalib Lodhi
(74) *Attorney, Agent, or Firm* — Schwegman Lundberg & Woessner, P.A.

(57) ABSTRACT

In one embodiment, a computer implemented method is illustrated as including receiving selection data generated by a media player application, the selection data being related to digital content. Additionally, generating an instruction set that includes the selection data, the instruction set being formatted based upon a Uniform Resource Identifier (URI) schema. Inserting the instruction set into a query portion of a URI. A method is also illustrated as including receiving a URI associated with digital content, the URI containing an instruction set in a query portion of the URI. Parsing the instruction set to retrieve selection data relating to the digital content. Further, the method may include retrieving the digital content based upon the selection data. Moreover, the method may include generating a data stream including the digital content. Additionally, the method may include transmitting the data stream including the digital content.

22 Claims, 16 Drawing Sheets

(56) References Cited

OTHER PUBLICATIONS

Girgensohn, A., et al., "Facilitating Video Access by Visualizing Automatic Analysis", *Human-Computer Interaction INTERACT '99, IOS Press*, (1999),205-212.

Lee, Hyowon, "The Fischlar Digital Video Recording, Analysis and Browsing System", *Proceedings of RIAO '2000: ContentBased Multimedia Information Access*, Paris, France.,(Apr. 12-14, 2000),1-10.

* cited by examiner

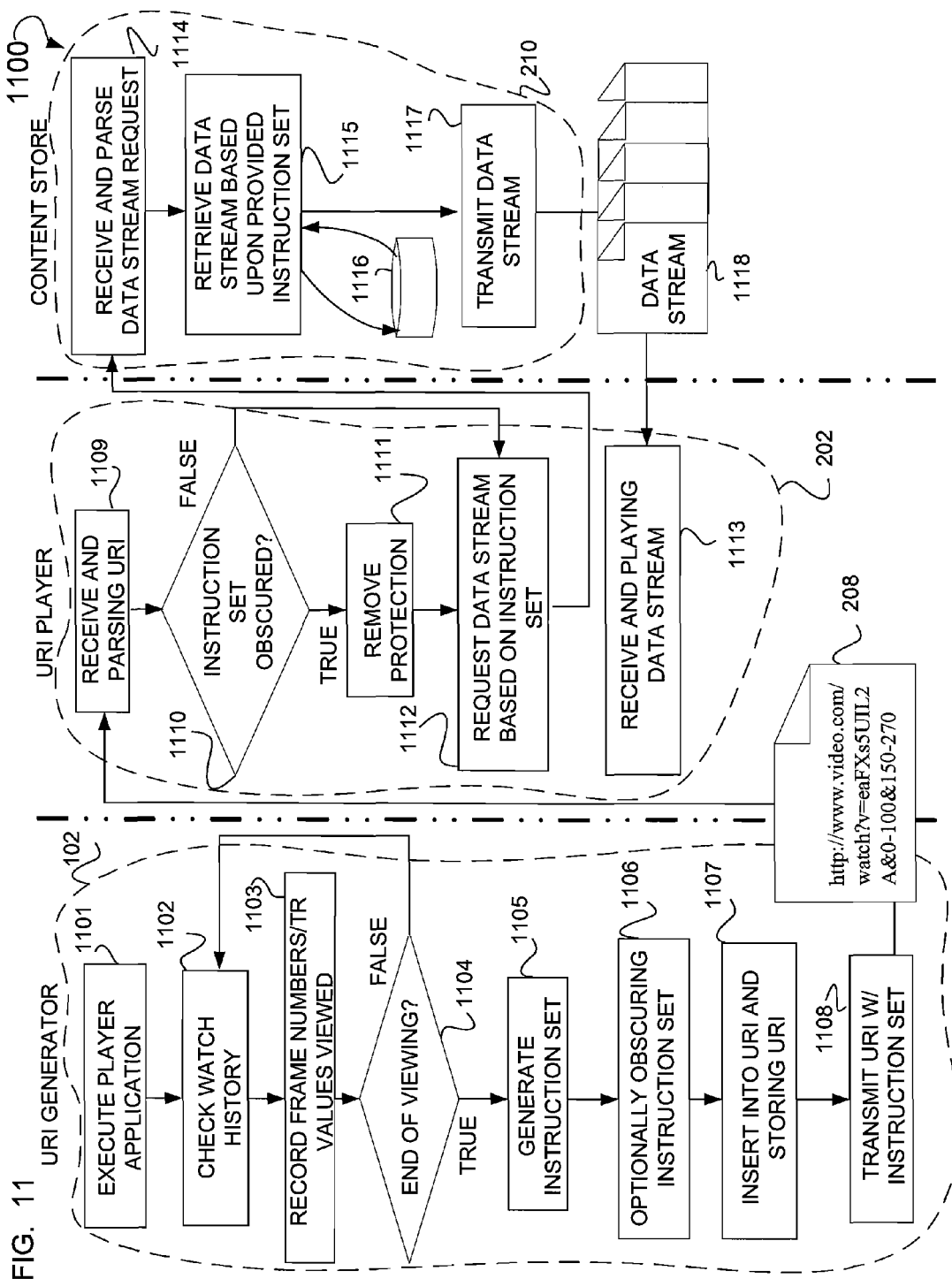

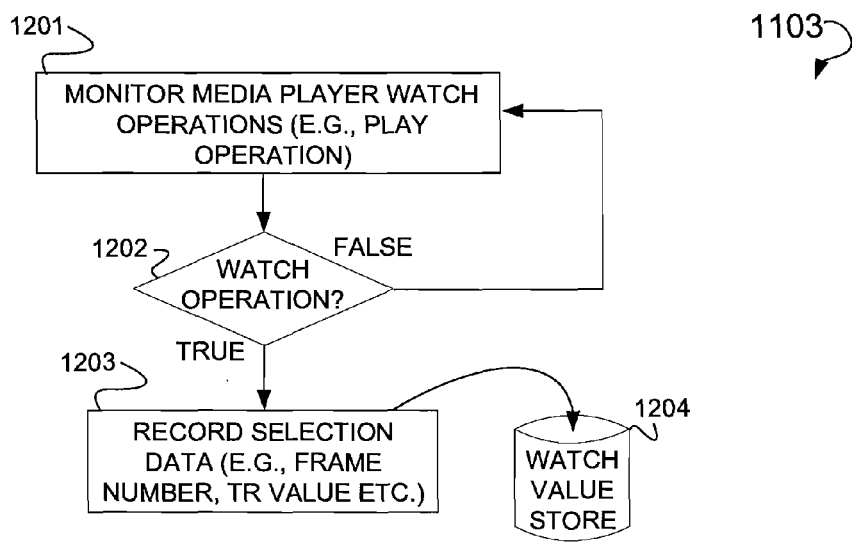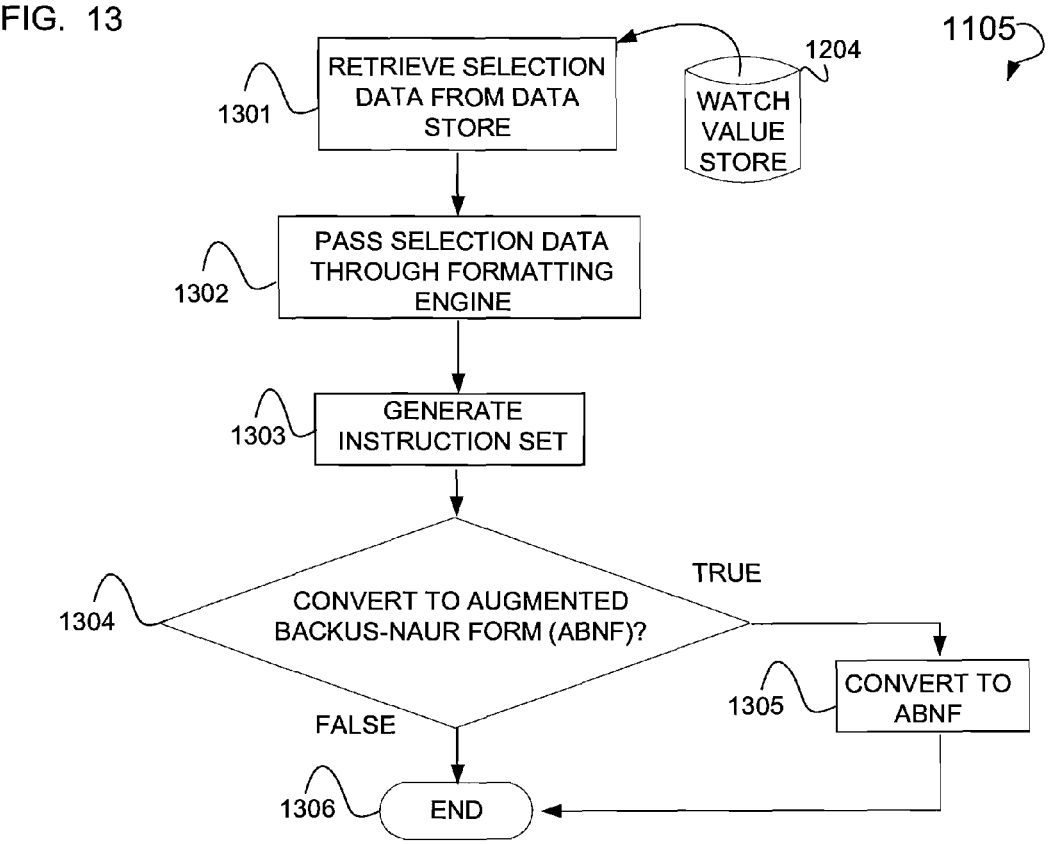

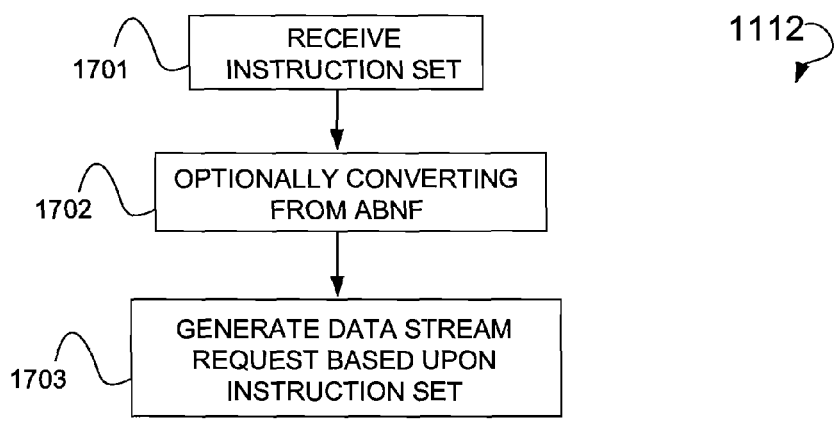
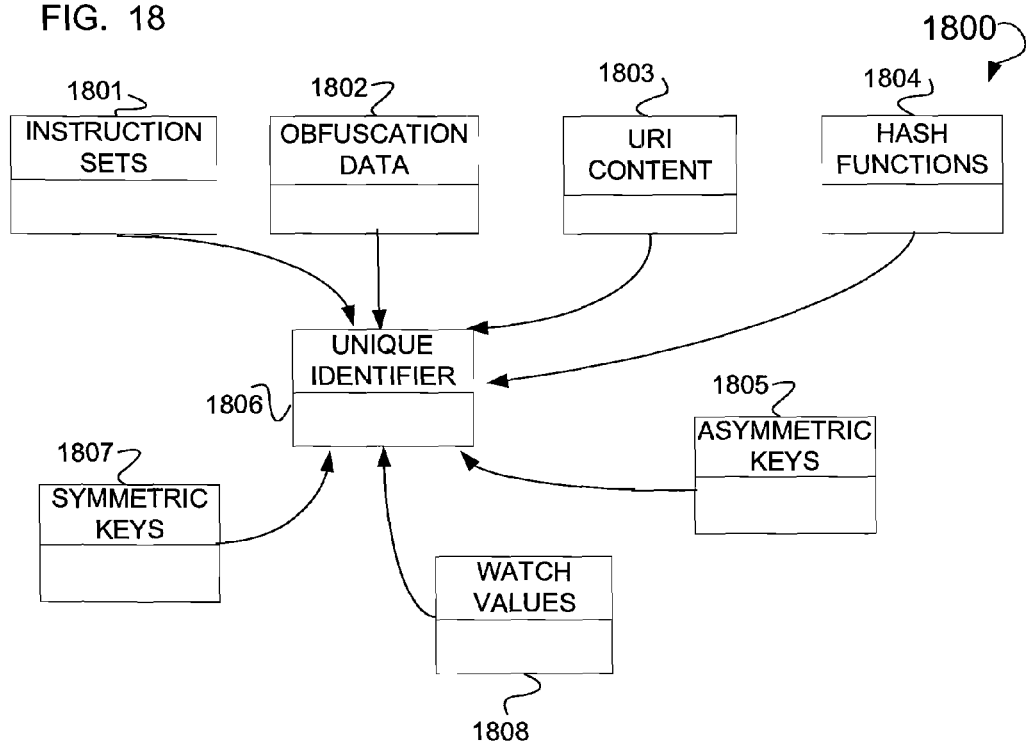

AUTOMATIC LINK GENERATION FOR VIDEO WATCH STYLE

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2007, Adobe Systems Incorporated. All Rights Reserved.

TECHNICAL FIELD

Example embodiments relate generally to the technical field of algorithms and programming and, in an example, to the generation and use of Uniform Resource Identifiers (URI) to retrieve content.

BACKGROUND

A URI schema outlines the structure of a URI such as a Uniform Resource Locator (URL). Grammatically, a URI may be expressed as: <scheme name>:<hierarchical part> [?<query>] [#<fragment>]. The query portion of this grammar may be used to provide information relating to some part of the hierarchical part. Further, this query portion may be delimited using a "?" character.

BRIEF DESCRIPTION OF THE DRAWINGS

Some embodiments are illustrated by way of example and not limitation in the figures of the accompanying drawings in which:

FIG. 11 is a tri-stream flowchart illustrating a method used to generate selection data in the form of a watch history, record this watch, and to obscure and transmit this watch history for viewing by another, according to an example embodiment.

FIG. 12 is a flowchart illustrating a method used to execute an operation that records frame numbers and/or Temporal Reference (TR) values viewed by a user, according to an example embodiment.

FIG. 13 is a flowchart illustrating a method used to execute an operation that generates an instruction set, according to an example embodiment.

FIG. 17 is a flowchart illustrating a method used to execute an operation to request for a data stream containing data corresponding to the instruction set, according to an example embodiment.

FIG. 18 is a Relational Data Scheme (RDA) illustrating various data tables that may be implemented on a suitable data stores, according to an example embodiment.

DETAILED DESCRIPTION

Figure 1:
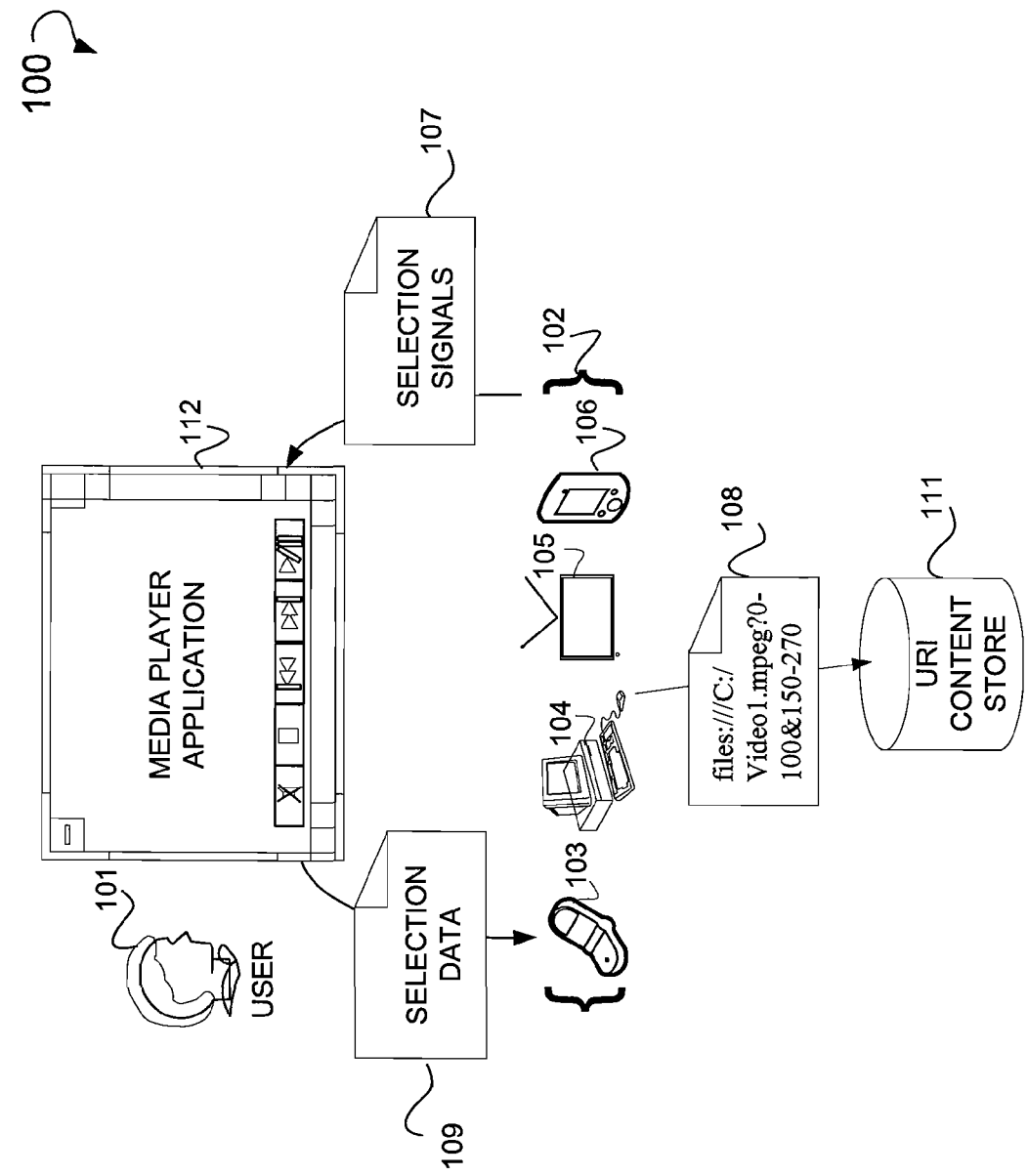
FIG. 1 is a diagram of an example system illustrating the generation of selection data in the form of a watch history to be stored in a persistent native data store, according to an example embodiment.

In some example embodiments, a system and method are outlined to allow a user to select certain portions of digital content (e.g., content such as audio, video, or audio-video content) using an instruction set embedded in a Uniform Resource Identifier (URI). For example, when a user watches a video or listens to a piece of audio (collectively digital content or content), the user performs some actions like "Forward", "Backward", "Stop", or "Play". If the user does not like some songs in a movie or some scenes in a movie, then as soon as the user reaches these scenes, the user would press the forward button to skip such scenes. Every user has a unique style of watching a video. The next time the user watches the same video, the user may have to perform these actions again. That is, the user may have to manually pass certain portions of the digital content using, for example, the "Forward," "Backward," or "Stop" operations. By embedding an instruction set into the query portion of a URI, the user may be able to avoid having to manually perform these actions again.

Some example embodiments may include the user sending this URI, and associated query information, to another user for use in viewing a piece of digital content. For example, the user wants to forward a video to another user for review, and that the user wants that other user only to watch/review interesting scenes in that video. In an example embodiment, the user, using an instruction set placed into the query portion of the URI, may specify markers (e.g., a range of values specified in an instruction set) in the video to communicate separately things like starting time of the scene, ending time of scene, etc. This instruction set may also be used in the streaming of video on the web.

In one example embodiment, the instruction set may be placed into the query portion of a URI. This example instruction set is outlined as follows: files:///C:/Video1.mpeg?0-100&150-270, or http://www.video.com/watch?v=eaFXs5UIL2A&0-100&150-270. The grammar and syntax for this URI, and associated query, is outlined below.

In some example embodiments, a media player application may be used to generate the URI and query portion associated therewith, and to store this URI. This media player application may be, for example, a MICROSOFT WINDOWS MEDIA PLAYER™, REAL NETWORKS REAL PLAYER™, FLASH™ MEDIA PLAYER, or some other suitable media player application. In one example embodiment, a media player may begin playing a piece of content using the following URI—http://www.video.com/watch?v=eaFXs5UIL2A&0-100&150-270. Reading and interpreting this URI, the media player application may Start playing from frame number 0
Stop at frame number 100
Go to frame number 150
Resume play at frame number 150 and stop at frame number 270

In some example embodiments, the above instruction may be based upon time (e.g., TR values common too many digital content formats such as the Moving Picture Experts Group (MPEG) format) instead of frames.

Some example embodiments may include the media player application automatically creating a watch history of a user. In such an embodiment, the media player application may automatically generate a URI containing a query portion reflecting the scenes viewed by the user. This query portion may include scenes, as denoted by frame or TR values, that are fast forwarded past, stopped at, or otherwise viewed or avoided by the user during the course of viewing. This query portion may also include scenes, as denoted by frame or TR values, that are to be played at a normal rate for viewing by a user. A normal rate may be a rate of, for example, 30 frames per second. Certain rules may be followed during the course of the viewing of digital content by the user. These rules may include:

Two consecutive "Forward" operations may be combined to form a single "Forward" operation as long as the play gap between these operations is less than a predefined value F (e.g., say 5 frames which indicates that the frames played were not significant play frames, but rather were played while seeking to the right frame by the user). Similar operations may be performed for "Backward"/"Reverse"

If two consecutive operations are "Forward" & "Backward", they will be combined to make a single "Forward" or "Backward" operation, as long the play gap is less than F In some example embodiments, the final link will look like: files:///C:/Video1.mpeg?0-100&150-270, which can then be used by the media player application in an intelligent manner to play the digital content, and can also be used by a server (e.g., a media server) to send only the required parts of the digital content to another user, or even the same user.

Example Grammar and Syntax

In some example embodiments, an instruction set is provided via the query portion of a URI so as to instruct a party receiving the URI as to what piece or pieces of digital content are to be viewed. Additional information may also be provided in this instruction set such as ratings related to the digital content, or portions thereof. In some example cases, this instruction set may be written observing such standards as Augmented Backus-Naur form (ABNF) such that instructions may be written in hexadecimal, decimal, or binary form. Some example embodiments may include obscuring portions of the instruction set using hashing, symmetric encryption, asymmetric encryption, or some other suitable obscuficating regime.

An example URI schema may be provided as follows:
http://Joe@email.com/favoritemovies/
?content="Jaws"#"World'sSharks"

This URI may be broken down into four parts: a scheme name (e.g., Hyper Text Transfer Protocol (HTTP)), a hierarchical part (e.g., an Internet Protocol (IP) address such as Joe@email), a query (e.g., ?content="Jaws"#), and a fragment (e.g., #"World's Sharks"). In some example cases a sequence of queries (e.g., instructions or an instruction set) may be provided such that more complex queries may be generated.

In some example embodiments, a series of queries may be strung together using the URI syntax for a query. A trivial example of the syntax for a query may be represented as <key>=<value>, where the beginning of the query is delimited by a "?", and the end of the query may be delimited by a "#". In some example cases, more than one query may be strung together using an "&" character.

For example, ?content="Jaws" may be strung together with other queries such that Joe's favorite movies may be not only Jaws, but also ET, Scarface, and Othello, as stated in the above outlined syntax:
?content="Jaws"&content="ET"&content="Scarface"&content="Othello"#

As illustrated above, some example embodiments may include the <value> containing complex statements delimited with the "&" character, or even organized using the <key>=<value> syntax. In some example cases, the above outlined query portion may retrieve certain pieces of content (e.g., the referenced digital content of "Jaws" "ET", Scarface etc.) depending on other operations with which this query portion is combined within a URI. For example, using the HTTP "GET" operation in combination with this query portion may result in these various pieces of content being retrieved for viewing. In some case, the "#" character may not be used.

Some example embodiments may include using numeric values formatted using ABNF to represent numeric values or ranges of values in a query. For example, the query portion ?v=eaFXs5UIL2A&0-100&150-270 may be represented as ?v=eaFXs5UIL2A&% x0-64&96-10E, where v=eaFXs5UIL2A is the key value for a piece of content (e.g., the movie "Jaws"). The statement "% x" denotes that the subsequent values are to be understood as hexadecimal values. Additional statements denoting decimal (e.g., % d), binary (e.g., % b), and even character values (e.g., %<ASCII value>) may be used. Further, as shown above string literals as denoted through the use of quotation marks (e.g., " ") may also be used.

In some example embodiments, other example syntax may be used alone or in combination with ABNF to denote certain a certain query. For example, in some example embodiments, the statement "&T" may be used to denote the use of time as a TR value to illustrate a portion of content. Some example embodiments may include the use of "&F" to denote the use of a frame value to illustrate a portion of content. For example, the query portion ?v=eaFXs5UIL2A&T&0-100&150-270 may represent a range of values as TR values, or ?v=eaFXs5UIL2A&F&0-100&150-270 may represent a range of values as frame values.

Some example embodiments may include the use of open-ended syntax to represent an open-ended range. For example, "&150-" may represent the range 150 to the end of a piece of content. And again, "&-150" may represent the beginning of a piece of digital content to the 150$^{th}$ frame of TR value. For example, the query portion ?v=eaFXs5UIL2A&0-100&150- may represent the range 0-100 and 150 to the end of the content, while ?v=eaFXs5UIL2A&-270 may represent the beginning to 270.

Example Obscurfication

In some example embodiments, the query portion, and instruction set contained therein, may be obscured using, for example, a hashing algorithm, symmetric encryption, asymmetric encryption, or some other suitable method for obscuring an alpha-numeric value. In one embodiment, the query value is hashed such that, for example, the query ?v=eaFXs5UIL2A&0-100&150-270 becomes ?EF46745A120, a hexadecimal value generated through the use of a hashing algorithm. Some examples of hashing algorithms include Message-Digest algorithm 5 (MD5), and the Secure Hash Algorithm (SHA) series of algorithms.

In addition to hashing, or, in lieu of hashing, other obfuscation techniques (e.g., a description of the act of obscuring) may also be applied to hide the query portion and instruction set contained therein including a symmetric encryption algorithm. Some examples of symmetric key algorithms include the Advanced Encryption Standard (AES), Twofish, Serpent, and Blowfish. In one embodiment, a media player application is compiled with one or more symmetric key values. One or more of these symmetric key values may then be used to encrypt the query portion of the URI so as to obscure the instruction set contained therein. Once encrypted, this URI may be sent to another media player or other suitable device. Once received by the media player or other suitable device, the media player may use its own symmetric key or range of key values to decrypt the query portion and read the instruction set.

In addition to hashing and/or the use of symmetric keys, or in lieu of hashing and/or the use of symmetric keys, other obfuscation techniques may also be applied to hide the query, and instruction set contained therein, including an asymmetric encryption algorithm. Some examples of asymmetric encryption algorithms include Rivest, Shamir and Adleman (RSA), and Diffie-Hellman. In one embodiment, a media player application or trusted server (e.g., a third party identity provider) authorized by the user generates a public key/private key pair. Once generated, the user keeps the private and distributes the public key. The private is then used by the user to encrypt the query portion of the URI and the instruction set contained therein. Once encrypted, the now encrypted query portion and the associated URI are sent to a second party for playing (e.g., for playing on another media player application). Once the URI containing the private key encrypted query portion is received, the query portion is decrypted with the public key for playing on, for example, the media player application. These various obfuscation techniques may be more fully illustrated below.

Example System

FIG. 1 is a diagram of an example system 100 illustrating the generation of selection data in the form of a watch history to be stored in a persistent native data store. Illustrated is a user 101 who, utilizing a media player application 112, generates selection signals 107. These selection signals may instruct, for example, a cell phone 103, a computer system 104, a television 105, and/or a Personal Digital Assistant (PDA) 106 (collectively referenced herein as one or more devices 102) to record a particular selection. This recording may be in the form of the user 101 executing a play button residing as a part of the media player application 112, a scroll bar residing as a part of the media player application 112, or some other function that is a part of the media player application 112. Once this selection signal 107 is generated, a selection data 109 is, in turn, generated. This selection data 109 is then converted into, for example, a URI value 108. This URI value 108 is stored into, for example, a URI content store 111. In some example embodiments, this URI content store 111 may reside as a part of one or more of the devices 102. In some example embodiments, as will be more fully illustrated below, this URI 108 may be provided to other devices to be used in the viewing of content. Further, as will be more fully illustrated below, the selection signals 107 and selection data 109 may be generated in respect to a piece of content (e.g., digital content such as audio content, video content, and/or audio-video content).

Figure 2:
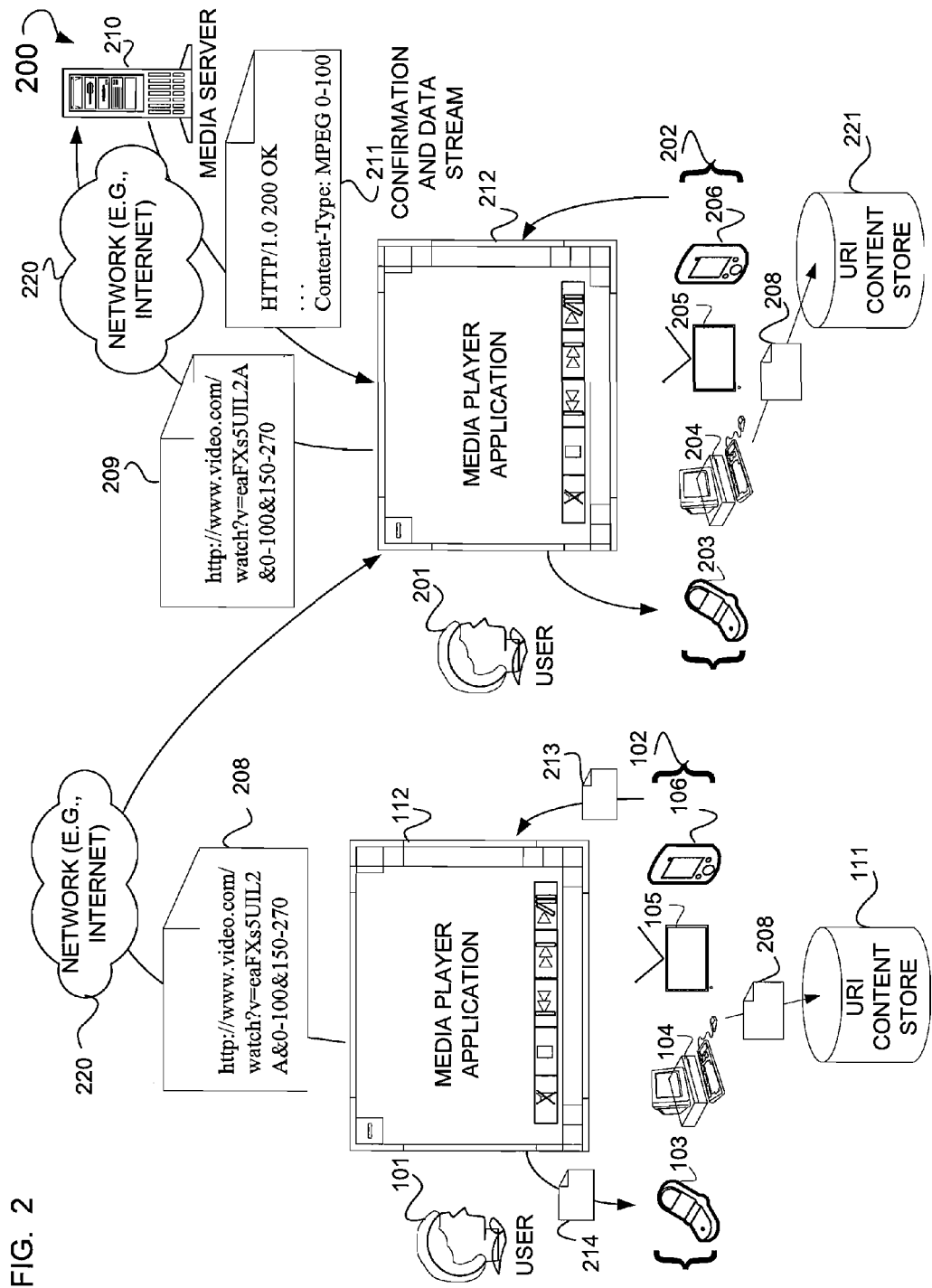
FIG. 2 is a diagram of a system illustrating the generation of a URI, and the providing of this URI over a network to another party or user, according to an example embodiment.

FIG. 2 is a diagram of an example system 200 illustrating the generation of a UM, and the providing of this URI over a network to another party or user. This other party or user may then use this URI to view a data stream reflecting selected portions of a piece of digital content as defined in the query portion (e.g., an instruction set) of the URI. Illustrated is the user 101 utilizing the media player application 112, and the one or more devices 102 upon which is media player application 112 resides, to generate selection signals 213. Once these selection signals 213 are generated, selection data 214 is generated and stored as a URI 208 onto the URI content store 111. In some example cases, this URI 208 may be transmitted across a network 220 by one or more of the devices 102. In example cases where this URI 208 is transmitted across a network, a HyperText Transfer Protocol (HTTP) schema may be associated with the URI. Once transmitted across the network 220, the URI 208 may be utilized via the user 201 using a media player application 212. This media player application 212 may reside on a number of devices 202 such as, for example, a cell phone 203, a computer system 204, a television 205, and/or a PDA 206. Associated with any one of these devices 202 may be some type of native persistent data store, such as a URI content store 221. Once the URI 208 is received by the user 201, using any one of the devices 202, a content request 209 may be generated wherein this content request 209 contains the URI information contained in the URI 208. Specifically, this content request 209 may utilize a link, such as an HTTP based hyperlink containing, for example, the query data supplied by the URI 208. This query data, now in the form of an instruction set, may instruct a device on the particular portions of content that are requested to be viewed by the user 201. For example, here a content request 209 is sent across a network 220 to a media server 210. This media server 210 may be a web server, a media server, or some other suitable type of server that facilitates the streaming of content, such as digital content. Further, in some example embodiments, a plurality of media servers may be used. Similarly, in some example embodiments, a plurality of web servers in combination with the plurality of media servers may be used.

In some example embodiments, once the content request 209 is received by the media server 210, the media server 210 may generate and send back across the network 220 a confirmation and data stream 211. In some example embodiments, this confirmation and data stream 211 may be a HTTP confirmation that precedes the streaming of content, such as digital content. Once received by the media player application 212, the confirmation data stream 211 may be played such that the selected portions of the content, as shown in the query portion of the content request 209 and URI 208, may be played. Here, for example, frame values 0 to 100 are being requested from the media server 210 and provided by the media server 210 to the media player application 212. In certain example cases, the URI 208 may be stored onto the previously illustrated URI content store 221 for future use by the user 201.

Figure 3:
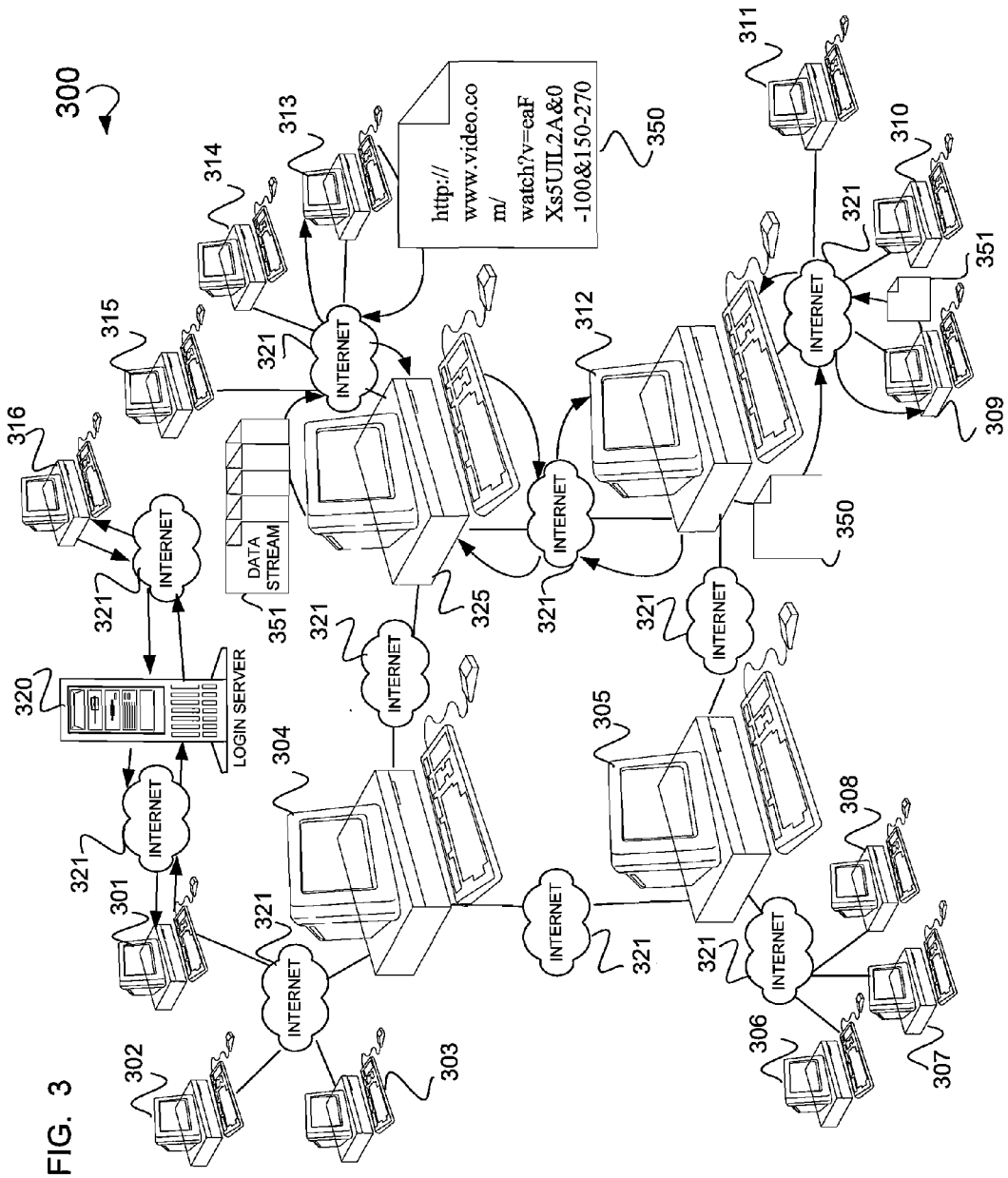
FIG. 3 is a diagram of a partially distributed peer to peer network, wherein a content request is made of one peer by another peer, according to an example embodiment.

FIG. 3 is a diagram of an example partially distributed peer to peer network 300, wherein a content request is made of one peer by another peer. Illustrated is a plurality of control peers 304, 305, 325, and 312. Operatively connected to each one of these control peers is a number of ordinary peers. For example, control peer 304 is operatively connected via an internet 321 to an ordinary peer 301, 302 and 303. Similarly, control peer 305 is operatively connected via the internet 321 to an ordinary peer 306, 307, and 308. Further, a control peer 325 is operatively connected via the internet 321 to an ordinary peer 313, 314, and 315. Also, control peer 312 is operatively connected via the internet 321 to ordinary peer 309, 310, and 311. In some example cases, an additional ordinary peer may become a part of this partially distributed peer to peer network by first, for example, logging onto a login server 320 via the internet 321. Here, an ordinary peer 316 logs onto the partially distributed peer to peer system via the previously illustrated internet 321 and login server 320.

Shown is an ordinary peer 313 that generates and transmits a URI 350 containing content information and, in particular, a range of content frame values, or TR values contained within the query portion of the URI 350. This URI 350 is transmitted across an internet 321 and ultimately to an ordinary peer 309. Further, this URI 350 may be part of a more general content request. Once received by the ordinary peer 309, a data stream containing the requested portion of the digital content as reflected in the query portion of the URI 350 is transmitted back across the internet 321 by the ordinary peer 309. This data stream 351 is then received by the ordinary peer 313 for playing. As previously illustrated elsewhere, this query portion may also be referred to as an instruction set wherein the query portion provides instructions generated by one ordinary peer (e.g., ordinary peer 313) to a second ordinary peer such as, for example, ordinary peer 309. While the peer to peer network 300 illustrated herein references a partially distributed peer-to-peer network, other types of peer to peer networks are also envisioned such as a wholly distributed peer to peer network utilizing query flooding.

Figure 4:
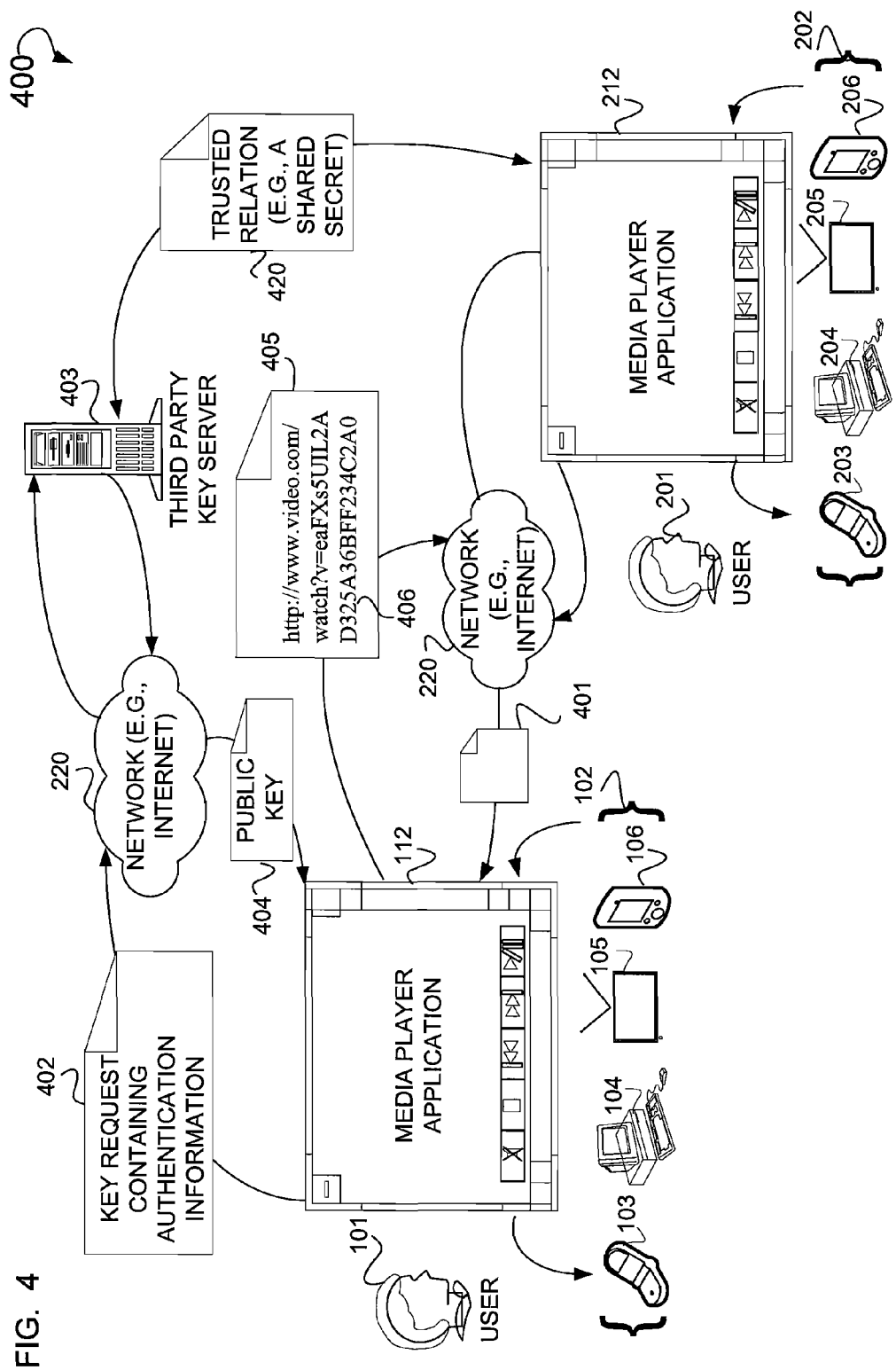
FIG. 4 is a system diagram of a system illustrating the use of asymmetric key encryption to obscure an instruction set contained within the query portion of a URI, according to an example embodiment.

FIG. 4 is a system diagram of an example system 400 illustrating the use of asymmetric key encryption to obscure an instruction set contained within the query portion of an URI. Illustrated is a user 101, utilizing the media player application 112, which may reside in any one of the number of devices 102, that may generate a particular URI value for viewing by another user, such as user 201. In example cases where some type of obfuscation method may be used for the purposes of obscuring the query portion of a URI, the user 101 may have to request a public key for the purposes of obscuring this query portion or instruction set. Shown is a key request 402 containing authentication information for the user 101. This key request 402 is transmitted across a network 220 to a third party key server 403. Once received by the third party key server 403, the identity of the user 101 is verified. In example cases where the identity of the user 101 is successfully identified, a public key 404 is transmitted by the third party key server 403 back across the network 220 to the user 101 utilizing the media player application 112. Once this public key 404 is received, this public key 404 is used to encrypt the query portion of a URI, such as URI 405. This URI 405 may be part of a more general content request. This encrypted query portion is reflected as a field 406.

In some example embodiments, this URI 405 is then transmitted by the user 101 utilizing the one or more devices 102 across the network 220 to a user 201 utilizing a media player application 212. This user 201 and, more specifically, the media player application 212 have a private key that corresponds to the public key 404 supplied by the third party key server. This private key may then be used to decrypt the field 406 revealing a range of frame values, or TR values corresponding to a particular instruction set or query portion of the URI 405. Once decrypted, the user 201 may be free to request the portion of digital content corresponding to the range of values illustrated in the query portion. In some example cases, a trusted relationship 420 in the form of, for example, a shared secret, such as a private key value, may exist between the third party key server 403 and the media player application 212.

In some example embodiments, some other use of asymmetric encryption may be utilized. For example, a public key supplied by, for example, a media server 210 may be utilized to encrypt a URI. Once the query portion of this URI is encrypted, the query portion may be sent to the media server 210 where the media server 210 may utilize its private key to decrypt this query portion. Where the decryption is successful, the identity of the requesting party (e.g., the party utilizing the public key) may be authenticated. Further, in other example embodiments, some other suitable use of asymmetric encryption may be utilized.

Figure 5:
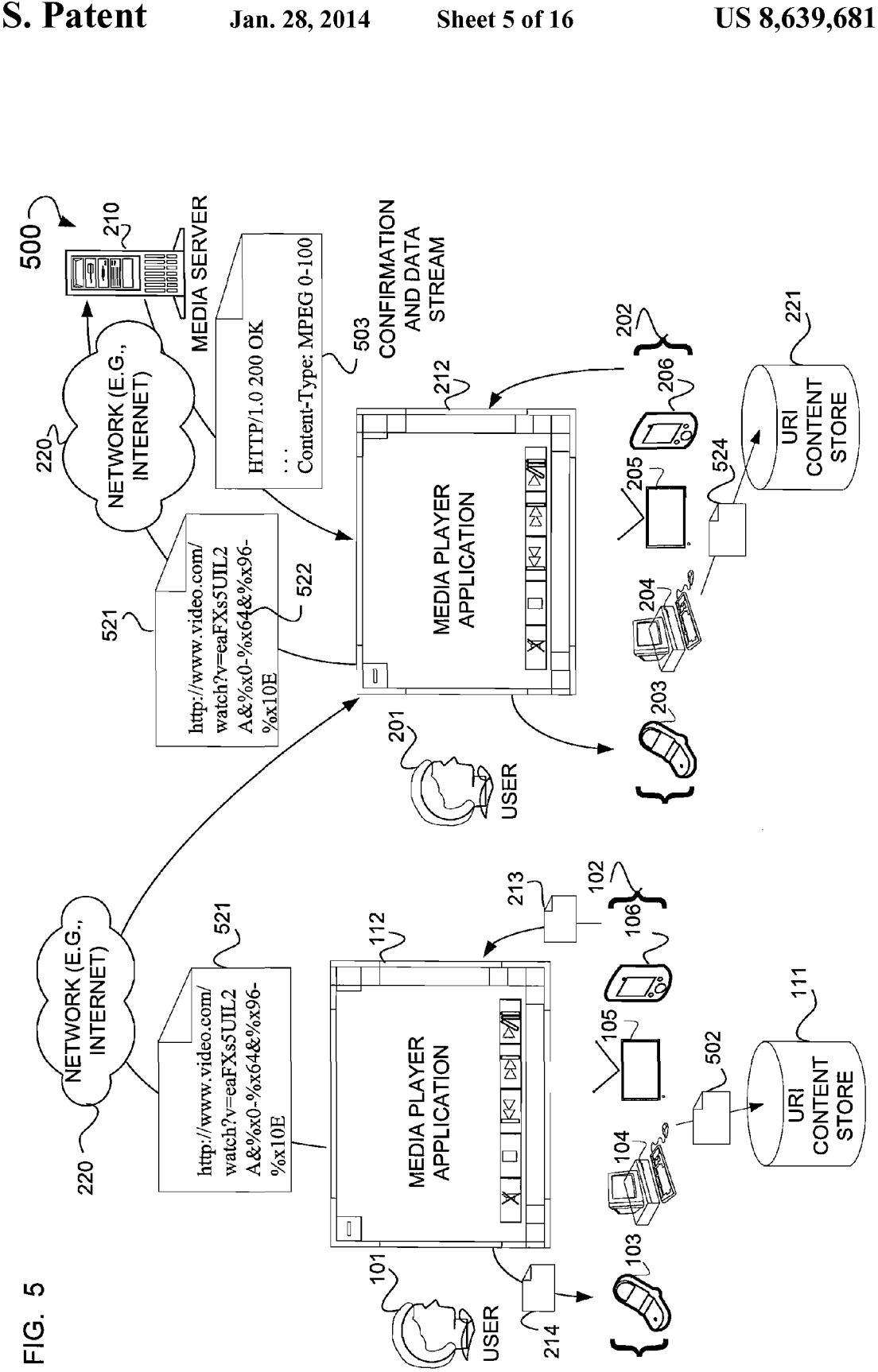
FIG. 5 is a diagram of system illustrating the use of Augmented Backus-Naur form (ABNF), according to an example embodiment.

FIG. 5 is a diagram of example system 500 illustrating the use of ABNF. Illustrated is a user 101, who, utilizing a media player application 112, generates a URI 521. This URI 521 may be part of a more general content request. In some example embodiments, this URI 521, and the data contained therein, may be stored as a content store 502 to the URI content store 111. In some example embodiments, this URI 521 is transmitted across a network 220 to a media player application 212 residing on one or more devices 202. This URI 521 may then be transmitted by the media player application 212 across network 220 to the media server 210. This URI 521 may contain a field 522 with a query portion and instruction set that is encoded using ABNF. Here, for example, the query portion is encoded using ABNF where the values contained in the query portion are represented in their hexadecimal form where these values correspond to a range of frame values, or TR values for a particular piece of content. Once received by the media server 210, the URI 521 (e.g., a content request) is processed and a confirmation and data stream 503 is returned where this confirmation may be, for example, an HTTP confirmation that is subsequently followed by the requested frame, and/or TR values. In some example embodiments, the media server 210 may convert the ABNF form of the query portion to some type of other representation of the values contained therein, such as a decimal, binary, octal, ASCII, or some other suitable representation of the data. Further, in some example cases, the URI 521 may be stored into a URI content store 221 as a URI 524. In some example embodiments, through the use of ABNF, a query, (e.g., an instruction set) and the ranges of values contained therein, may be represented in a more compact form than, for example, representing the query portion in a binary or even decimal form.

Example Interfaces

Figure 6:
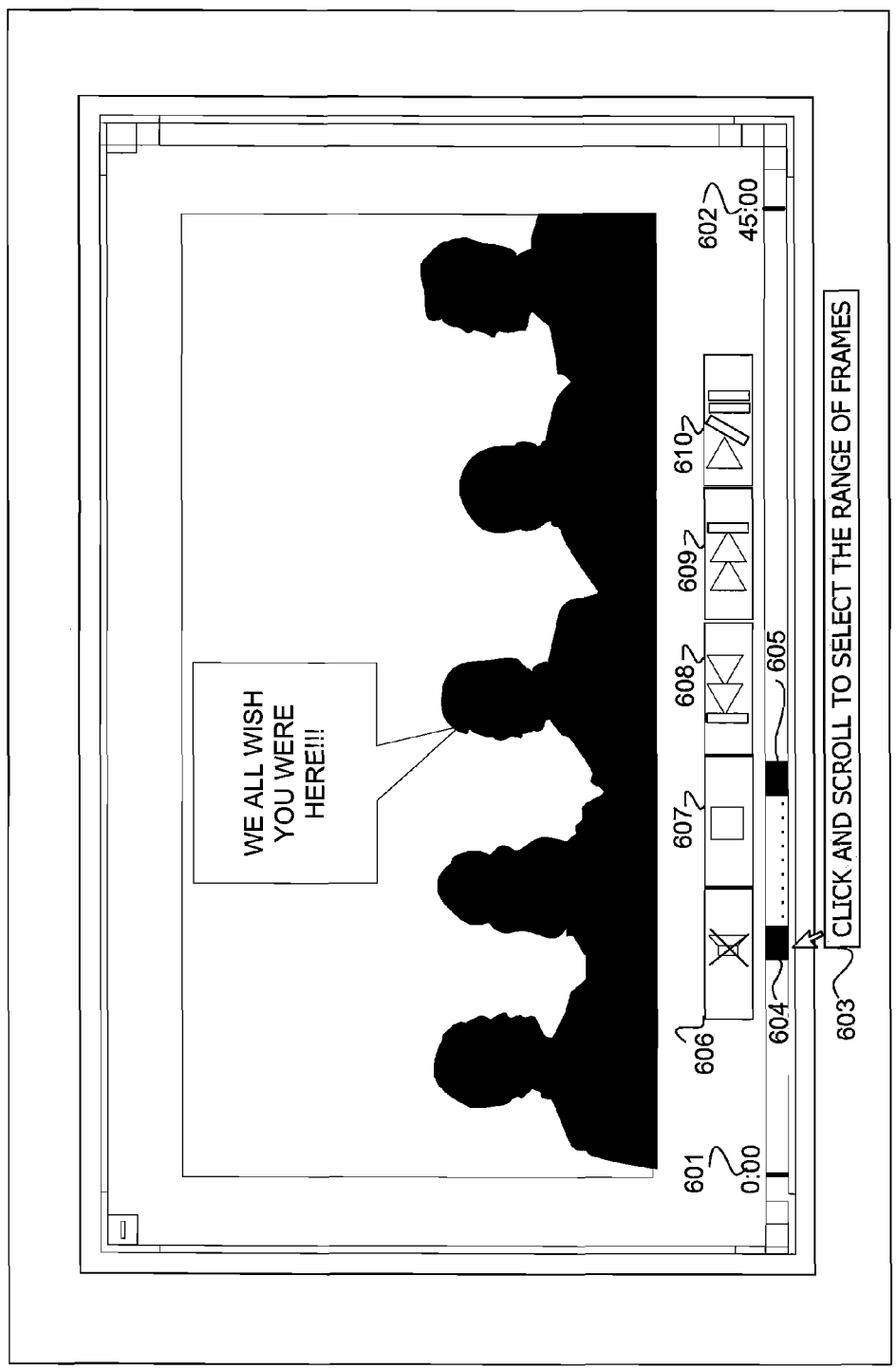
FIG. 6 is a diagram of a Graphical User Interface (GUI) used to generate selection data, such as selection data, according to an example embodiment.

FIG. 6 is a diagram of an example Graphical User Interface (GUI) used to generate selection data, such as selection data 109. This GUI may reside on the media player application 112. In some example embodiments, a user's (e.g., user 101) watch history may be automatically recorded by, for example, the media player application 112. A watch history may be the viewing history of a particular user, where this viewing history includes all portions of content played at a normal viewing rate as might be encountered through the execution of a play operation or other function residing on the media player application. Once recorded, selection data, such as selection data 109, is generated and stored, for example, as a URI 108, or as, for example, a URI 208. This select data may be data that reflects the watch history of user 101, and may include examples such as TR values or frame values. In other instances, the user 101 may be able to choose which portions of the digital content (e.g., selection data) are actually selected. Here, for example, the media player application 112 has a number of different functions associated with it that allow further viewing of contents such as digital content. For example, a mute function 606, a play function 607, a fast forward function 608, a reverse function 609, and a pause function 610 are illustrated. Further illustrated are various scroll functions such as, for example, a first position 604 of a scroll button or bar, and a second position 605 of the scroll button or bar. Further illustrated is the beginning time for a piece of digital content as 0:00 (see referent 601), and an end time for a particular piece of digital content, as 45:00, referenced herein as 602. In some example embodiments, a user such as user 101 may be able to utilize a mouse pointer 603 to manipulate a scroll button or bar such that all ranges of frame or TR values between the first position 604 of the scroll bar or button, and a second position 605 may be captured as watch history and more fundamentally as selection data. In certain example cases, the mouse pointer 603 may provide some type of textual information to a user, such as user 101, regarding the functionality that is associated with executing various functions that are illustrated and that reside as a part of, for example, the media player application 112.

Figure 7:
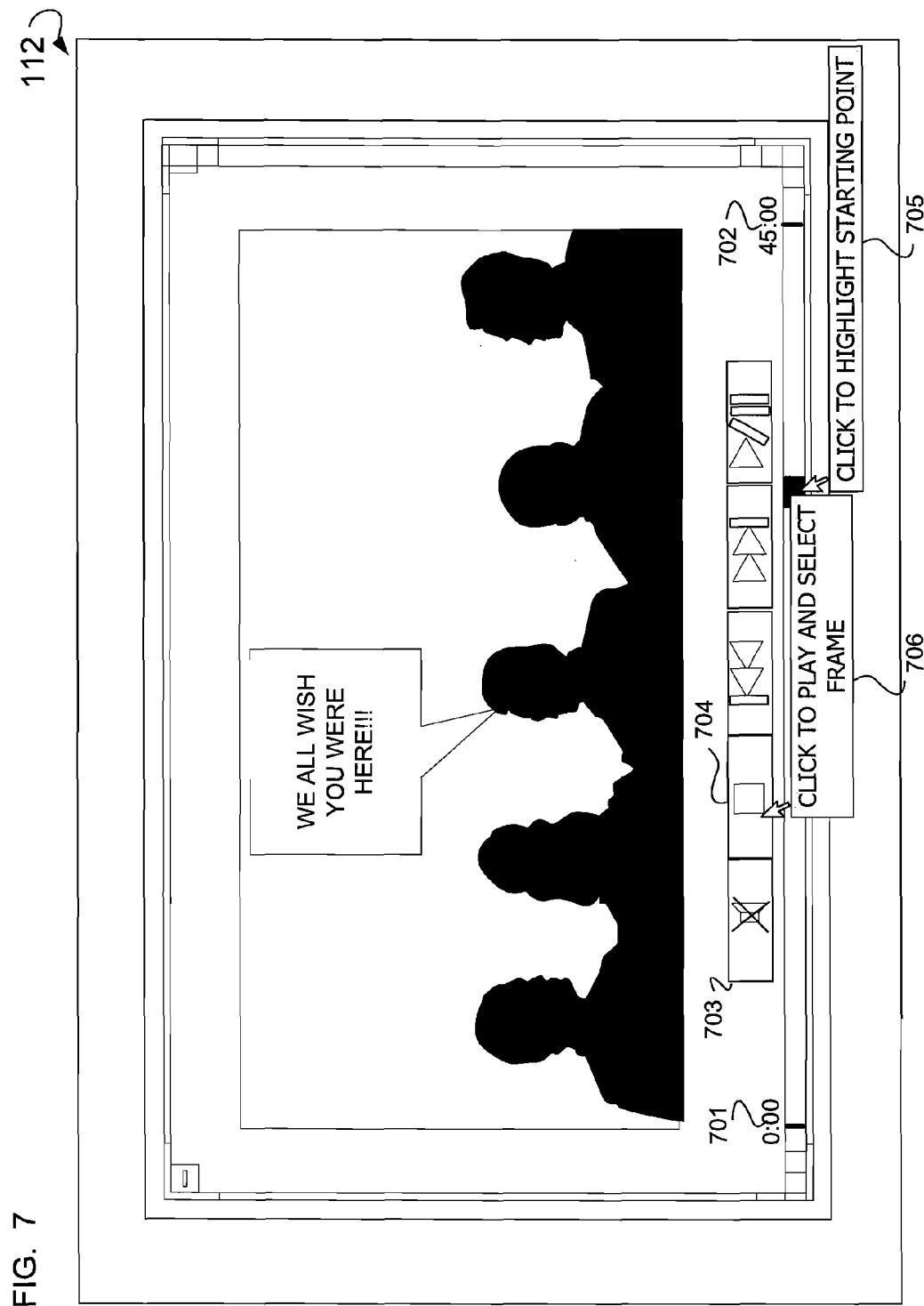
FIG. 7 is a diagram of a GUI for a media player application wherein this GUI illustrates the use of a scroll bar selection button to initiate a starting point for the generation of watch history, and specifically selection data, according to an example embodiment.

FIG. 7 is a diagram of an example GUI for a media player application 112 wherein the GUI illustrates the use of a scroll bar selection button to initiate a starting point for the generation of a watch history, and specifically of selection data. Illustrated is a start time 701 of a particular piece of content, and an end time referenced by 702. Further, a media player application function bar 703 is illustrated with, for example, a play button 704. In some example embodiments, a user, such as user 101, may be able to utilize the mouse pointer 705 to move a scroll button or bar to a particular position. Once the mouse pointer 706 is moved to the illustrated position, the mouse pointer 706, may be utilized to execute the play button 704. Once executed, the watch history and, more specifically, the selection data may be generated starting from the time selected by the positioning of the scroll button or bar to the end time 702 of the digital content. In one embodiment, mouse pointer 705 and mouse pointer 706 are the same mouse pointer, but merely distinguished here for illustrative purposes.

Figure 8:
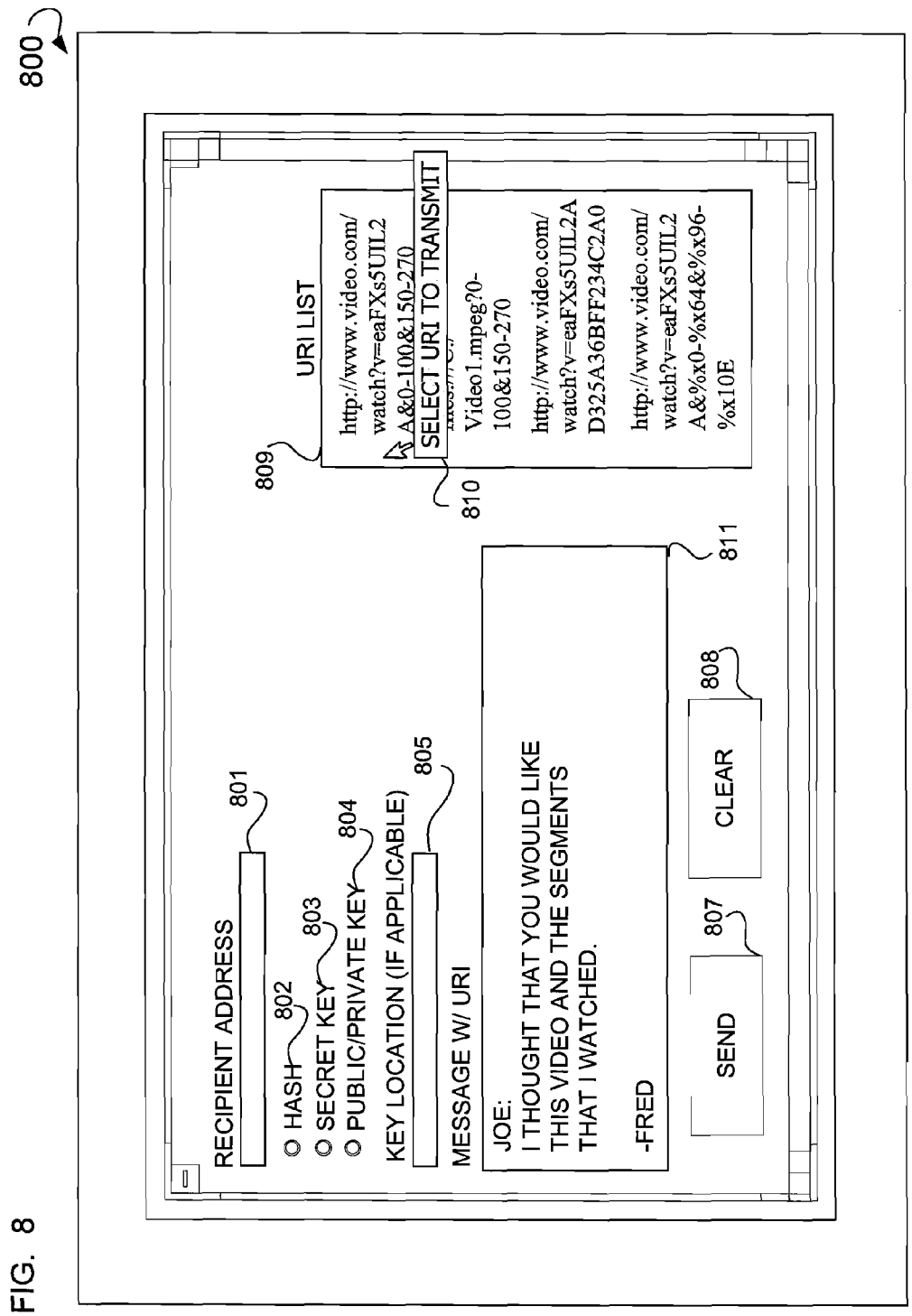
FIG. 8 is a GUI used to set certain types of protections to obscure the instruction set (e.g., the query portion) of a URI, according to an example embodiment.

FIG. 8 is an example GUI 800 used to set certain types of protections to obscure the instruction set (e.g., the query portion) of a URI. Illustrated is a recipient address field label and its associated text box 801 wherein the recipient of a particular URI, such as URI 208, may be provided. Once the address of the recipient is provided, here at the text box 801, then any one of a number of radio buttons 802 through 804 may be used to set certain ways in which the query value or, more specifically, the instruction set associated with this URI, such as URI 208, may be obscured. For example, this query value may be hashed by executing the radio button 802, a symmetric key value may be used to obscure this query value by executing the radio button 803, and/or a public key may be used to obscure this query value via the execution of a radio button 804. In example cases where the radio button 804 is executed, the location of a particular key server, such as a third party key server 403, may have to be specified via entering its location into the text box 805. As previously illustrated, through the execution of radio button 802, a hash, such as an MD5 algorithm, may be utilized. Further, where radio button 803 is executed, a secret key, such as a symmetric key may be utilized as generated by, for example, an AES algorithm. Further, where private key/public key encryption, otherwise known as asymmetric encryption, is utilized, an algorithm such as RSA may be implemented. A message field 811 is provided to allow a user, such as user 101, to associate a message with the particular URI value. In some example cases, a URI list field 809 is provided that lists the various URIs that are available and that may be sent by a user such as a user 101 to, for example, a user 201. In some example cases, a mouse pointer 810 may be utilized to highlight, focus or otherwise select one of these URI values. In some example embodiments, once a way of obscuring a particular query portion or instruction set for a URI is selected, and a message provided, a user, such as user 101, may choose to send the URI value to another user by executing the send button 807, or may choose to start over by clicking on a clear button 808.

Example Method

Figure 9:
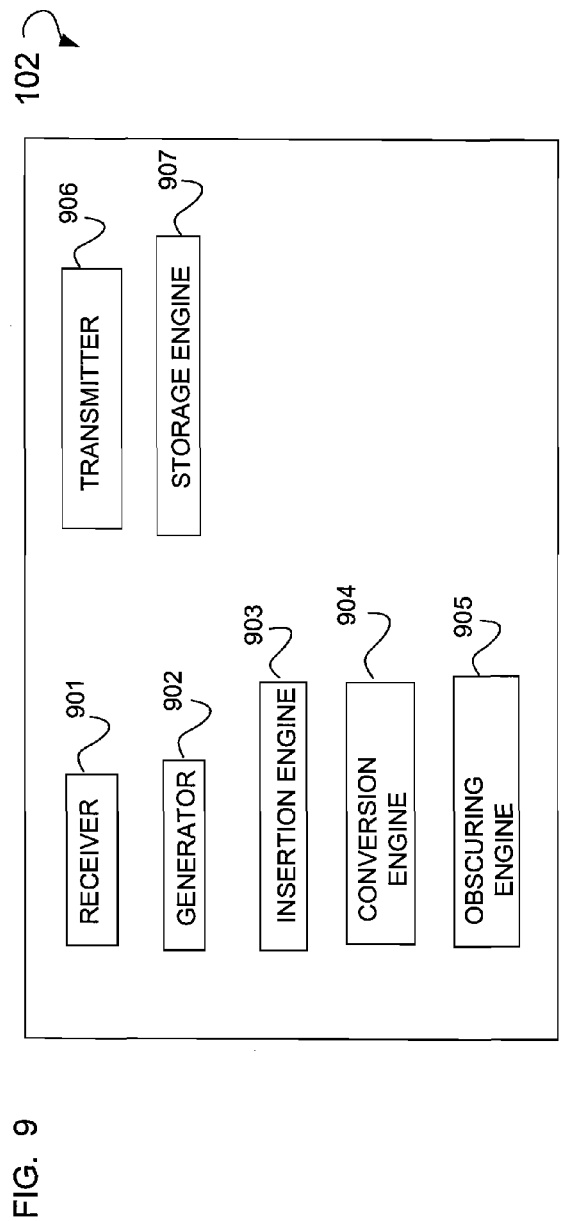
FIG. 9 is a block diagram of an example computer system in the form of a device, according to an example embodiment.

FIG. 9 is a block diagram of an example computer system in the form of a device 102. The various blocks illustrated herein may be implemented as hardware, firmware, or even as software. Shown is a receiver 901 to receive selection data generated by a media player application, the selection data being related to digital content. Also illustrated is a generator 902 to generate an instruction set that includes the selection data, the instruction set being formatted based upon a URI schema. An insertion engine 903 is also illustrated that inserts the instruction set into a query portion of a URI. The instruction set may include a range of values corresponding to at least one of a frame value, or a TR value. The selection data may include at least one of a frame value, or a TR value. Also illustrated is a conversion engine 904 to convert a portion of the instruction set into ABNF. Additionally, an obscuring engine 905 is shown to obscure the instruction set based upon at least one of a hashing algorithm, a symmetric encryption algorithm, or an asymmetric algorithm. Moreover, a transmitter 906 is shown that transmits the URI. Further, a storage engine 907 is shown that stores the URI.

Figure 10:
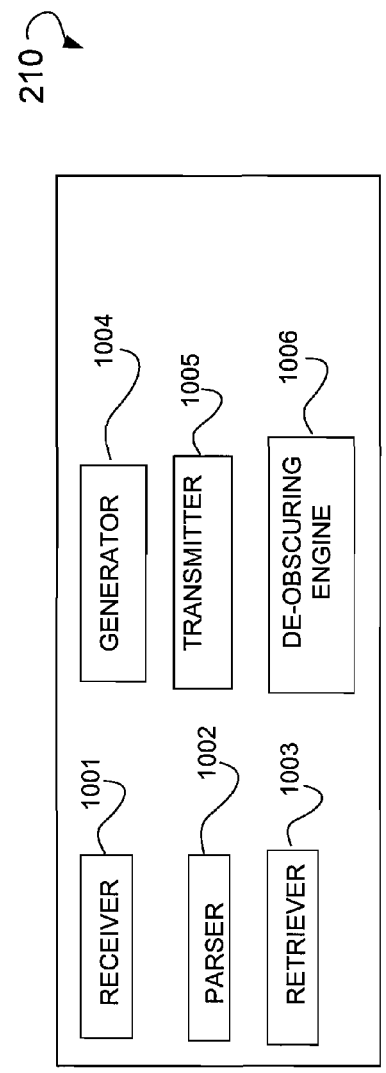
FIG. 10 is a block diagram of an example computer system in the form of a media server, according to an example embodiment.

FIG. 10 is a block diagram of an example computer system in the form of a media server 210. The various blocks illustrated herein may be implemented as hardware, firmware, or even as software. Shown is a receiver 1001 to receive a URI associated with digital content, the URI containing an instruction set in a query portion of the URI. A parser 1002 is also illustrated to parse the instruction set to retrieve selection data relating to the digital content. Further, a retriever 1003 is shown to retrieve the digital content based upon the selection data. Also, a generator 1004 is illustrated that generates a data stream that includes the digital content. Moreover, a transmitter 1005 is shown that transmits the data stream that includes the digital content. Further, a de-obscuring engine 1006 is shown to de-obscure the instruction set based upon at least one of a hashing algorithm, a symmetric encryption algorithm, or an asymmetric algorithm. In certain example cases, the selection data includes at least one of a frame value, or a TR value.

FIG. 11 is a tri-stream flowchart illustrating the example method 1100 used to generate selection data in the form of a watch history, record this watch, and to obscure and transmit this watch history for viewing by another. The first stream of this tri-stream flowchart is titled "URI generator," the second stream is titled "URI Player" and the third stream is titled "Content Store." Starting with the first stream titled "URI Generator," a plurality of operations 1101 through 1108 are illustrated, wherein this plurality of operations resides on, for example, one or more of the devices 102. Shown is an operation 1101 that executes a player application, such as media player application 112. Once executed, an operation 1102 is executed that checks a watch history associated with this media player application. Next, an operation 1103 is executed that records frame numbers and/or TR values viewed by, for example, the user 101. Then, a decisional operation 1104 is executed that determines whether a user, such as user 101, has ended his viewing of a particular piece of content. In example cases where decisional operation 1104 evaluates to false, operation 1102 is re-executed and the watch history for a particular user, such as user 101, is checked and, where necessary, recorded. In example cases where decisional operation 1104 evaluates to true, a further operation 1105 is executed that generates an instruction set. As previously shown, this instruction set may be similar to, for example, the query portion of a URI value. In some example embodiments, an operation 1106 is executed wherein this instruction set may be obscured.

In some example embodiments, as will be more fully illustrated below, this obscuring can take the form of applying various methods to the instruction set such as hashing the instruction set, applying a symmetric encryption method or algorithm to the instruction set, and applying an asymmetric encryption algorithm to the instruction set. Further, as will be more fully illustrated below, combinations of these various obscuring methods may be applied such that, for example, an instruction set may first be obscured with a symmetric key utilizing a symmetric algorithm, a public key of an asymmetric algorithm may then be applied to further obscure the instruction set, and finally this instruction set may be hashed, further obscuring it. Once the instruction set is obscured, where such is required or requested by, for example, the user 101 or the user 201, the instruction set is inserted into the URI and stored via the execution of operation 1107. Next, an operation 1108 is executed to transmit the URI with the instruction set. In certain example cases, before an instruction set is obscured, the instruction set may be converted into ABNF via the execution of the previously illustrated operation 1105.

Upon the successful execution of operations 1107 and 1108, the URI is transmitted with the instruction set as, for example, a URI 208. This URI 208 may be either requested and/or received through the execution of an operation 1109 that resides on, for example, one or more devices 202. This operation 1109 may use a Real-Time Streaming Protocol (RTSP), the aforementioned HTTP, or some other suitable protocol to request the URI 208, or to receive a request to receive the URI 208. Additional operations that may reside on this device 202 may include, for example, decisional operation 1110 and further operations 1111 through 1113. Upon the execution of the operation 1109 a decisional operation 1110 is executed to determine whether or not the instruction set is obscured. In example cases where a decisional operation 1110 evaluates to true, then operation 1111 is executed. In example cases where a decisional operation 1110 evaluates to false, then the instruction set is not obscured, and an operation 1112 is executed. With regard to the operation 1111, this operation acts to remove the measures used to obscure the instruction set when executed. That is, the instruction set may be de-hashed, decrypted, or de-hashed and decrypted in some way. With regard to the operation 1112, when executed a request for a data stream containing data corresponding to the instruction set made of, for example, the previously illustrated media server 210. As illustrated herein, once operation 1112 is executed, an operation 1114 is executed that receives and parses a data stream request. This parsing may be based upon some type of predefined grammar instructing the operation 1114 as to the syntax of the instruction set. This grammar may instruct as to, for example, where a range of values (e.g., frame or TR values) begins or ends. This data stream request may be, for example, an HTTP or RTSP based request Next, an operation 1115 is executed that retrieves a data stream based upon a provided instruction set, the data stream retrieved from a data store 1116 containing digital content. Then, an operation 1117 is executed that transmits the data stream as a data stream 1118. This transmission of the data stream 1118 may utilize, for example, HTTP, or RTSP to stream the particular portions of digital content as outlined in an instruction set contained in a query field (see e.g., URI 521 containing the field 522 with a query). The data stream 1118 is received through the execution of an operation 1113 to be played on, for example, the media player application 212.

FIG. 12 is a flowchart illustrating an example method used to execute operation 1103. Illustrated is an operation 1201 that monitors a media player watch operation, such as, for example, the play operation/function or one of the other operations/functions outlined or otherwise illustrated in FIGS. 6 and 7. Next, a decisional operation 1202 is executed that determines whether or not a watch operation has been executed. In example cases where decisional operation 1202 evaluates to false, then operation 1201 is re-executed. In example cases where a decisional operation 1202 evaluates to true, that is, a watch operation has been executed, then a further operation 1203 is executed that records the selection data, such as selection data 109, associated with the watch operation. The selection data may be in the form of, for example, a frame number, a TR value or some other suitable data type. This selection data is stored into, for example, a watch value store 1204.

FIG. 13 is a flowchart illustrating an example method used to execution operation 1105. Illustrated is an operation 1301 that retrieves selection data from a watch value store 1204. Next, an operation 1302 is executed that passes the selection data through a formatting engine. Then, an operation 1303 is executed that generates an instruction set. Once the instruction set is generated, a decisional operation 1304 is executed that determines whether or not the instructions set should be converted into an ABNF form. The decision to convert the instruction set into an ABNF form may be determined by, for example, the user 101. In example cases where decisional operation 1304 evaluates to true, then the instruction set is converted into ABNF form via the execution of an operation 1305. In example cases where decisional operation 1304 evaluates to false, a termination condition 1306 is executed. Once operation 1305 is executed, the termination condition 1306 is executed.

Figure 14:
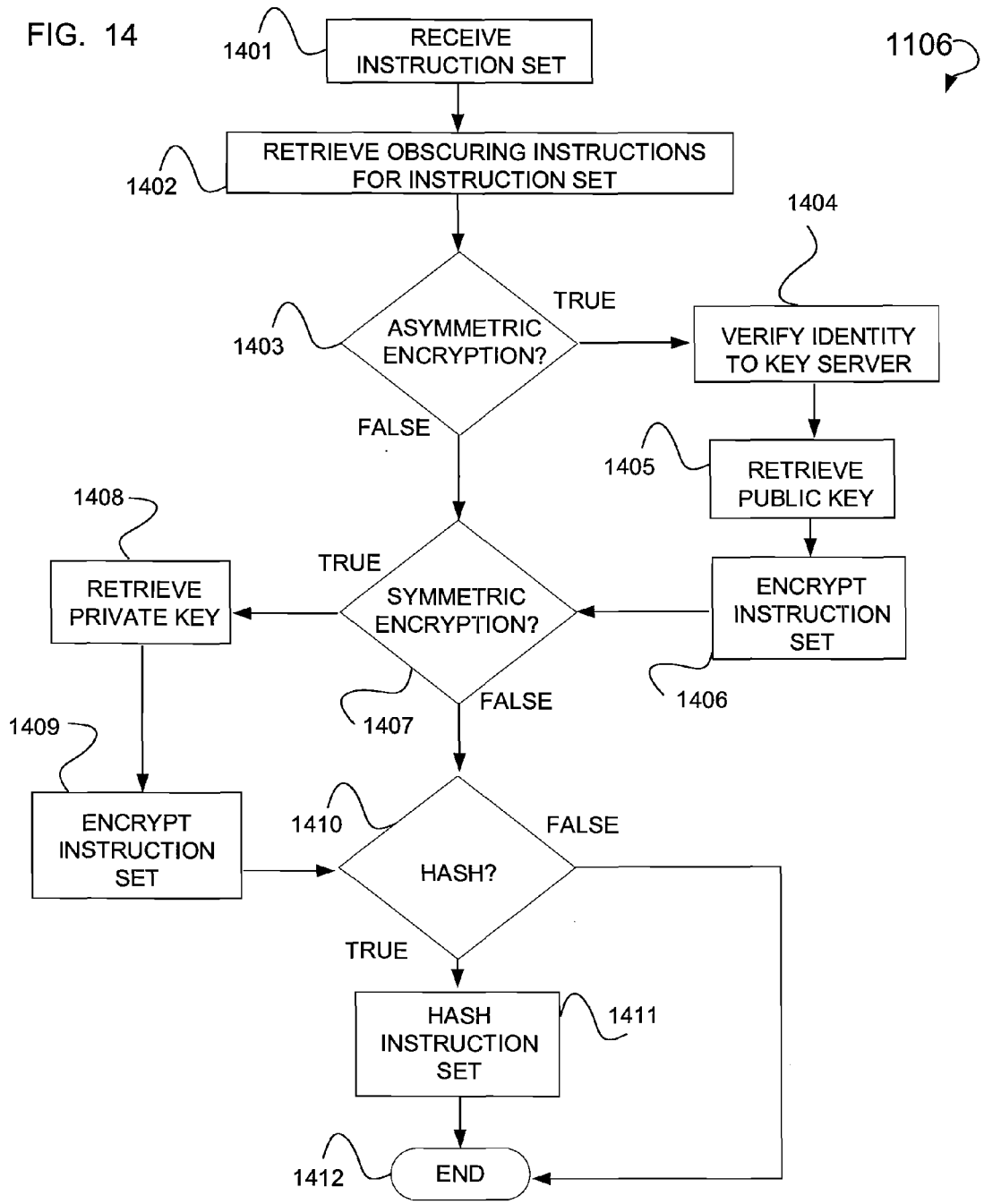
FIG. 14 is a flowchart illustrating a method used to execute an operation to obscure an instruction set, according to an example embodiment.

FIG. 14 is a flowchart illustrating an example method used to execute an operation 1106. Shown is an operation 1401 that receives an instruction set. Once received, an operation 1402 is executed that retrieves obscuring instructions for the particular instruction set. Next, a decisional operation 1403 is executed that determines whether an asymmetric encryption algorithm should be applied in the instruction set. In examples where decisional operation 1403 evaluates to true, an operation 1404 is executed that verifies the identity of a particular user, such as user 101 to a key server, such as a third party key server 403. Next, assuming the successful verification of the user's identity through the execution of operation 1405 (e.g., a public key had been retrieved), then an operation

1406 is executed to encrypt the instructions utilizing the public key. In example cases where decisional operation 1403 evaluates to false, then a further decisional operation 1407 is executed that determines whether or not in a symmetric encryption algorithm should be applied in the instruction set. The same decisional operation 1407 is executed upon the successful completion of the execution of operation 1406. In example cases where a decisional operation 1407 evaluates to true, an operation 1408 is executed that retrieves a private key. This private key may be retrieved from, for example, the one or more devices 102 wherein this key may be, for example, generated during the compilation of the media player application 112, or may be supplied and stored as a part of, for example, some natively residing stored content, such as the URI content store 111.

In some example embodiments, after the successful execution of operation 1408, an operation 1409 is executed that encrypts the instruction set using the symmetric key or private key retrieved for the execution of the operation 1408. Once this instruction set is encrypted with the symmetric key retrieved via the execution of the operation 1408, a further decisional operation 1410 is executed. This decisional operation 1410 may be executed upon either the successful execution of operation 1409, or the decisional operation 1407 evaluating to false. This decisional operation 1410 determines whether or not the instruction set, which may be symmetrically encrypted, asymmetrically encrypted, or not encrypted, should be hashed (e.g., that is be passed through a hashing algorithm). In example cases where decisional operation 1410 evaluates to false, a termination condition 1412 is executed. In example cases where a decisional operation 1410 evaluates to true, that is a hashing algorithm is applied to the instruction set, which may be encrypted or not encrypted, an operation 1411 is executed that hashes the instruction set. Upon the successful execution of operation 1411, the termination condition 1412 is executed.

As previously illustrated, the asymmetric algorithm as identified and applied through the execution of operations 1404 through 1406 may be, for example, the RSA algorithm. In example cases where symmetric encryption is utilized via the execution of operations 1408 and 1409, a symmetric encryption algorithm such as AES may be applied. In example cases where hashing is utilized via the execution of operation 1411, a hashing algorithm, such as MD5, may be applied to the instruction set. Further, as previously illustrated, the hashing algorithm may be used alone or in combination with the asymmetric encryption algorithm and/or the symmetric encryption algorithm. Further, the asymmetric, symmetric, and/or hashing may be applied to an instruction set in its ABNF form.

Figure 15:
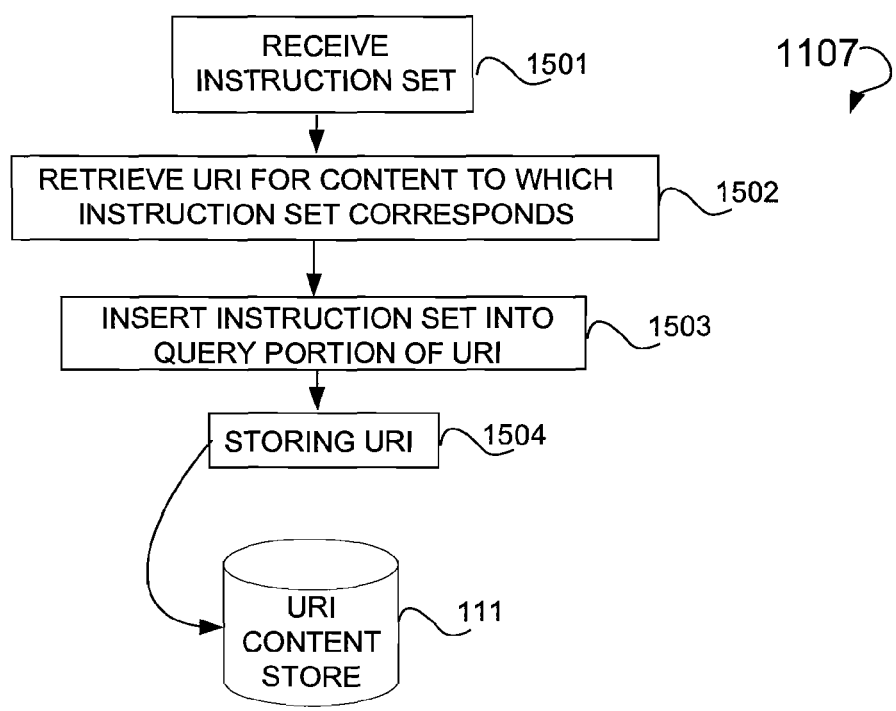
FIG. 15 is a flowchart illustrating a method used to execute an operation to insert the instruction set into a URI and store it, according to an example embodiment.

FIG. 15 is a flowchart illustrating an example method used to execute operation 1107. Illustrated is an operation 1501 that receives an instruction set. Once received, an operation 1502 is executed that retrieves a URI for a particular piece of content to which the instructions set corresponds. Next, an operation 1503 is executed that inserts the instruction set into the query portion of the URI. Then, an operation 1504 is executed that stores this URI containing the instruction set as part of its query field into, for example, a URI content store 111.

Figure 16:
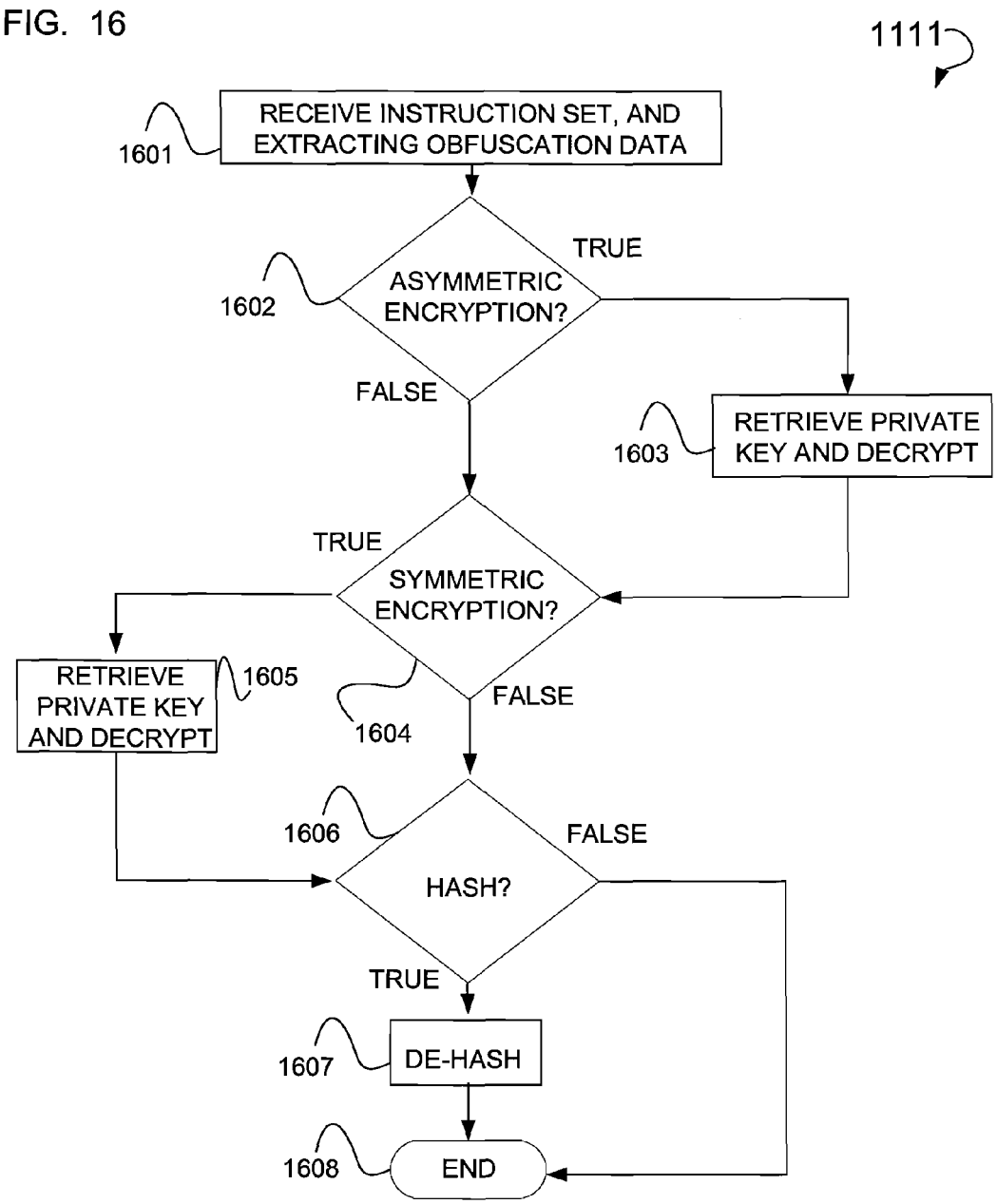
FIG. 16 is a flowchart illustrating a method used to execute an operation to remove the measures used to obscure an instruction set, according to an example embodiment.

FIG. 16 is a flowchart illustrating an example method used to execute operation 1111. Illustrated is an operation 1601 that receives an instruction set and extracts the obscuring data from this instruction set. Next, a decisional operation 1602 is executed that is used to determine whether or not this obscured data has been asymmetrically encrypted. In example cases where a decisional operation 1602 evaluates to true, then a further operation 1603 is executed that retrieves a private key and decrypts the obscured data using this private key. In example cases where decisional operation 1602 evaluates to false, then a further decisional operation 1604 is executed that determines whether or not the obscured data has been encrypted using symmetric encryption. In example cases where decisional operation 1604 evaluates to true, then a further operation 1605 may be executed that retrieves a private symmetric key and uses this private symmetric key to decrypt the obscured data. The further decisional operation 1604 may be executed either through decisional operation 1602 evaluating to false or through the successful execution of operation 1603. In example cases where decisional operation 1604 evaluates to false, or where operation 1605 is successfully executed, then a further decisional operation 1606 may be executed. This decisional operation 1606 evaluates whether or not the obscured data has been hashed. In example cases where decisional operation 1606 evaluates to false, then a termination condition 1608 is executed. In example cases where decisional operation 1606 evaluates to true, then an operation 1607 is executed that, in effect, de-hashes the obscured data. After the successful execution of 1607, then terminating condition 1608 is executed.

As previously illustrated elsewhere, the sequence of decryption and de-hashing, or de-hashing and decryption may be performed in a variety of sequences. For example, the de-hashing may be performed first and then decryption, or decryption may be performed first and then de-hashing. Further, this de-hashing or decryption may be applied to obscured data in its ABNF form. Moreover, as previously illustrated and shown, various asymmetric encryption algorithms may include, for example, RSA whereas various symmetric encryption algorithms may include AES, and further various hashing algorithms may include, for example, MD5.

FIG. 17 is a flowchart illustrating an example method used to execute operation 1112. Illustrated is an operation 1701 that receives an instruction set. Once received, an operation 1702 is executed that may optionally convert the instruction set from its ABNF form. Once optionally converted, an operation 1703 is executed that generates a data stream based upon the instruction set provided or the provided instruction set. This data stream request may then be sent across a network such as, for example, a network 220 to, for example, a media server 210, wherein this media server 210 provides, for example, a confirmation and data stream 211 in response.

Example Database

Some example embodiments may include the various databases (e.g., 111, 211, 1116, and 1204) being relational databases or in some example cases OLAP based databases. In the case of relational databases, various tables of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using MDX may be implemented. In the case of a database using tables and SQL, a database application such as, for example, MYSQL™, SQLSERVER™, Oracle 81™, 10G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

FIG. 18 is an example RDA 1800 illustrating various data tables that may be implemented on, for example, the URI content store 111, or other suitable data stores (e.g., 111, 211, 1116, and 1204). Illustrated is table 1801 containing one or more instruction sets. These one or more instruction sets may be in the form of data reflecting a particular range of frame values or TR values for a particular piece of content. A string, eXtensible Markup Language (XML), or character data type may be used to store this instruction set data. Also illustrated is an obfuscation data table 1802 that contains data corresponding to the instruction set and reflecting whether or not a particular instruction set has been obscured using symmetric encryption, asymmetric encryption, and/or hashing. In some example embodiments, various sequences of char values may be used as a data type such that, for example, the obfuscation data may contain, for example, the first letter of the particular symmetric, asymmetric or hashing algorithm that may be applied to the instruction set to which it corresponds. Further, in some example cases, a boolean value data type may be utilized to denote what types of symmetric, asymmetric, or hashing algorithms may be applied to a particular instruction set.

Also illustrated is a table 1803 that contains URI content. In some example cases, the additional fields of a particular URI may be stored or these fields may be, for example, a scheme name, a hierarchical part, or a fragment value corresponding to particular URI. In some example cases, an XML data type or a string data type may be used to store this URI content data. Table 1804 contains data pertaining to particular hashing function for a particular instruction set. In some example cases, the actual hashing function itself may be stored into this table 1804 such that a string or even a Binary Large Object (BLOB) data type may be utilized. For example, the BLOB data type may be used to store the actual hashing function algorithm itself, whereas the string data type may only be used to store, for example, the name of the hashing function (e.g., MD5). Further, a table 1805 is illustrated containing an asymmetric key. Stored within table 1805 may be an asymmetric key, for example, a public key corresponding to a private key wherein this public key may be used to, for example, encrypt a particular instruction set. This key may be, for example, an integer, float, double, string, or some other suitable data type. Further, a table 1807 is illustrated that contains symmetric keys. Contained in table 1807 are various symmetric keys they may be used to obscure a particular instruction set, wherein this symmetric key may be a private key in the form of a float, double, integer, or some other suitable data type. In the case of either the data contained in the table 1805 for asymmetric keys, or the data contained in a table 1807 for symmetric keys, these key values may be of some suitable length including, for example, a 128 bit key, a 256 bit key, or some other suitable key size. Also, in some example cases, a BLOB data type may be used as the basis to store either an asymmetric key into table 1805, or a symmetric key into table 1807. Further, a table 1808 is illustrated that contains the various watch values. These watch values may be, for example, a frame value or a range of frame values, or a TR value, or a range of TR values that correspond to or may be considered as, for example, selection data such as selection data 109 that are selected by, for example, a user 101. These watch values may include, for example, a string data type or some other suitable data type. Further illustrated is the table 1806 that contains a unique identifier for the various values contained in the various tables illustrated herein (e.g., 1801 through 1805, and 1807 through 1808). This unique identifier value may contain values or serve as unique key values for each of the particular tuple entries in each of the afore-illustrated tables.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

Figure 19:
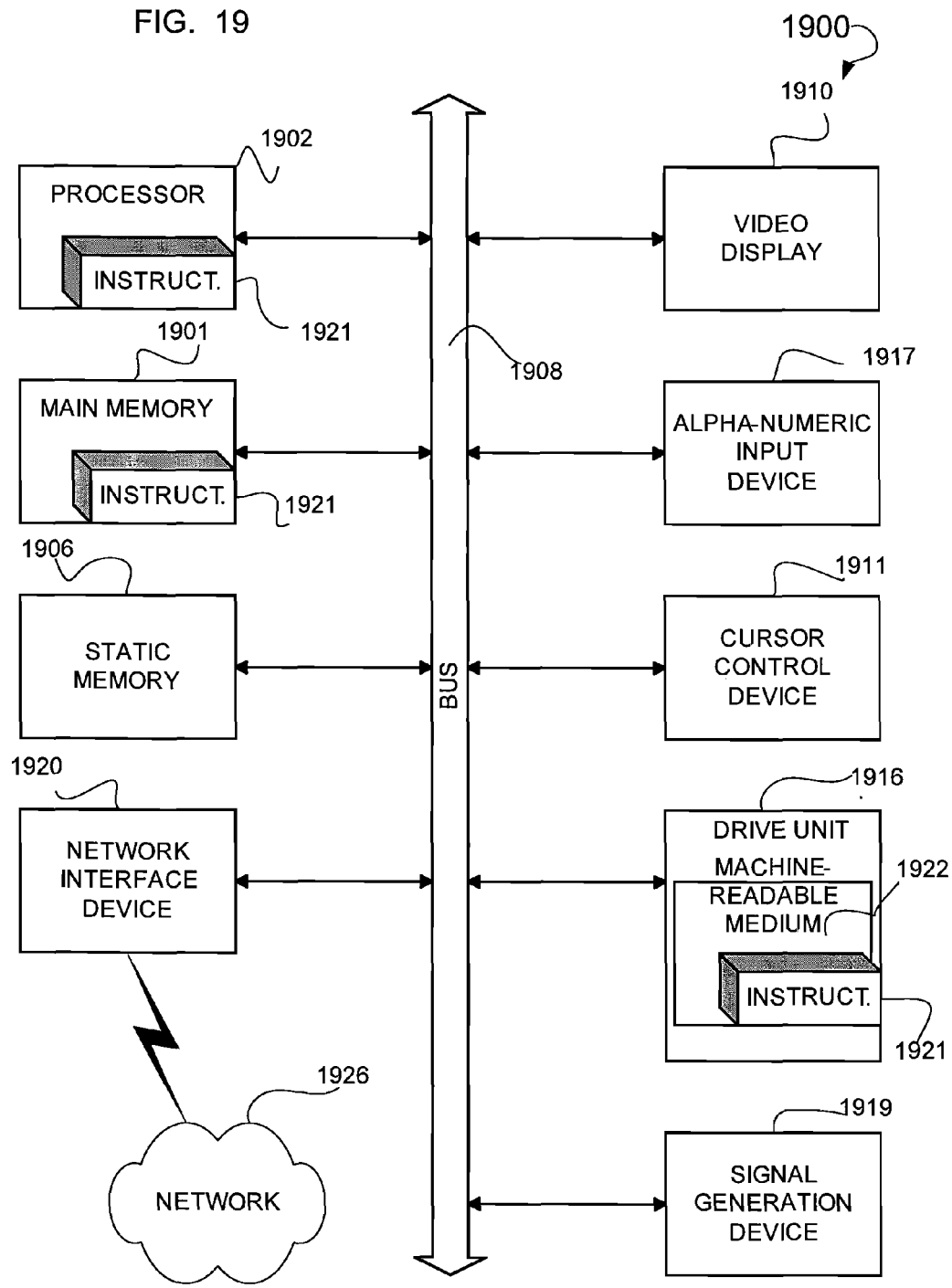
FIG. 19 shows a diagrammatic representation of a machine in the example form of a computer system that executes a set of instructions to perform any one or more of the methodologies discussed herein.

FIG. 19 shows a diagrammatic representation of a machine in the example form of a computer system 1900 that executes a set of instructions to perform any one or more of the methodologies discussed herein. In alternative example embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1900 includes a processor 1902 (e.g., a Central Processing Unit (CPU), a Graphics Processing Unit (GPU) or both), a main memory 1901, and a static memory 1906, which communicate with each other via a bus 1908. The computer system 1900 may further include a video display unit 1910 (e.g., a Liquid Crystal Display (LCD) or a Cathode Ray Tube (CRT)). The computer system 1900 also includes an alpha-numeric input device 1917 (e.g., a keyboard), a User Interface (UI) cursor controller 1911 (e.g., a mouse), a disk drive unit 1916, a signal generation device 1919 (e.g., a speaker) and a network interface device (e.g., a transmitter) 1920.

The drive unit 1916 includes a machine-readable medium 1922 on which is stored one or more sets of instructions and data structures (e.g., software) embodying or used by any one or more of the methodologies or functions illustrated herein. The software may also reside, completely or at least partially, within the main memory 1901 and/or within the processor 1902 during execution thereof by the computer system 1900, the main memory 1901 and the processor 1902 also constituting machine-readable media 1922.

The instructions 1921 may further be transmitted or received over a network 1926 via the network interface device 1920 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

Some example embodiments may include the use of the query portion of a URI to transmit an instruction set relating to selected portions of content (e.g., audio or video digital content) selected by a user for viewing or listening. This instruction set may be automatically generated by, for example, a media player application, wherein the user chooses to fast-forward past a particular portion of content. Once generated, this instruction set may be stored as part of the query portion of a URI. The entire URI, in turn, may be stored for future use by the user, or may be transferred by the user to another user for use in viewing and listening to the content. Through the use of instruction sets, queries, and URIs, the user need not repeat the act of manually fast-forwarding through certain portions of content deemed irrelevant. Further, the user may be able to express their likes and dislikes to other users regarding certain pieces of content by providing the other users with the URI containing the queries and selected pieces of content.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed example embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
receiving selection data generated by a media player application, the selection data being related to at least two non-contiguous digital video portions of a single item of digital video content;
generating an instruction set that includes the selection data, the instruction set being formatted based upon a Uniform Resource Identifier (URI) schema, the instruction set further including a set of markers, the set of markers specifying a range of Temporal Reference (TR) values for each of the at least two non-contiguous digital video portions; and
inserting the instruction set into a query portion of a single URI, the query portion of the single URI, when submitted by a viewing media player to a content store causes the content store to use the set of markers to provide only the at least two non-contiguous digital video portions of the single item of digital video content to the viewing media player in a continuous stream, the continuous stream excluding each remaining portion of the single item of digital video content.

2. The computer implemented method of claim 1, wherein the selection data includes at least one of a frame value, or a Temporal Reference (TR) value and the instruction set includes a range of values corresponding to at least one of a frame value.

3. The computer implemented method of claim 1, wherein the selection data includes a user selection of at least one of a mute function, a play function, a fast forward function, a reverse function, or a pause function.

4. The computer implemented method of claim 1, further comprising converting a portion of the instruction set into an Augmented Backus Naur Form (ABNF).

5. The computer implemented method of claim 1, further comprising obscuring the instruction set based upon at least one of a hashing algorithm, a symmetric encryption algorithm, or an asymmetric algorithm.

6. The computer implemented method of claim 1, further comprising transmitting the URI wherein the at least non-contiguous digital video portions are not thumbnails.

7. The computer implemented method of claim 1, wherein the providing of only the at least two non-contiguous digital video portions of the single item of digital video content to the viewing media player in a continuous stream is an automated operation occurring without intervention by a user.

8. A computer implemented method comprising:
receiving a single Uniform Resource Identifier (URI) associated with a single item of digital video content, the single URI containing an instruction set in a query portion of the single URI, the instruction set identifying at least two non-contiguous digital video portions of the single item of digital video content;
parsing the instruction set to retrieve selection data relating to the at least two non-contiguous digital video portions of the single item of digital video content, the selection data including a set of markers specifying a range of Temporal Reference (TR) values for each of the at least two non-contiguous digital video portions;
retrieving the at least two non-contiguous digital video portions of the single item of digital video content based upon the selection data;
generating, using the set of markers, a data stream including only the at least two non-contiguous digital video portions of the single item of digital video content, the data stream excluding each remaining portion of the single item of digital video content; and
transmitting the data stream as a continuous digital video stream including only the at least two non-contiguous digital video portions of the single item of digital video content, each of the remaining portions of the single item of digital video content being excluded from the continuous digital video stream.

9. The computer implemented method of claim 8, further comprising de-obscuring the instruction set based upon at least one of a hashing algorithm, a symmetric encryption algorithm, or an asymmetric algorithm.

10. The computer implemented method of claim 8, wherein the each of the TR values of the range of TR values corresponds to a temporal location in the single item of digital video content.

11. A computer system comprising:
a processor;
a memory device;
instructions held in the memory device and executable by the processor, the instructions defining:
a receiver to receive selection data generated by a media player application, the selection data being related to at least two non-contiguous digital video portions of a single item of digital video content;
a generator to generate an instruction set that includes the selection data, the instruction set being formatted based upon a Uniform Resource Identifier (URI) schema, the instruction set further including a set of markers, the set of markers specifying a range of Temporal Reference (TR) values for each of the at least two non-contiguous digital video portions; and
an insertion engine to insert the instruction set into a query portion of a single URI, the query portion of the single URI, when submitted by a viewing media player to a content store causes the content store to use the set of markers to provide only the at least two non-contiguous digital video portions of the single item of digital video content to the viewing media player in a continuous stream, the continuous stream excluding each remaining portion of the single item of digital video content.

12. The computer system of claim 11, wherein the selection data includes a frame value, or a Temporal Reference (TR) value and wherein the instruction set includes a range of values corresponding to at least one of a frame value.

13. The computer system of claim 11, wherein the selection data includes at least one user selection of a mute function, a play function, a fast forward function, a reverse function, or a pause function.

14. The computer system of claim 11, further comprising a conversion engine to convert a portion of the instruction set into an Augmented Backus Naur Form (ABNF).

15. The computer system of claim 11, further comprising an obscuring engine to obscure the instruction set based upon at least one of a hashing algorithm, a symmetric encryption algorithm, or an asymmetric algorithm.

16. The computer system of claim 11, further comprising a transmitter to transmit the URI.

17. A computer system comprising:
   a processor;
   a memory device;
   instructions held in the memory device and executable by the processor, the instructions defining:
   a receiver to receive a single Uniform Resource Identifier (URI) associated with at least two non-contiguous digital video portions of a single item of digital video content, the single URI containing an instruction set in a query portion of the single URI;
   a parser to parse the instruction set to retrieve selection data relating to the at least two non-contiguous digital video portions of the single item of digital video content, the selection data including a set of markers specifying a range of Temporal Reference (TR) values for each of the at least two non-contiguous digital video portions;
   a retriever to retrieve the at least two non-contiguous digital video portions of the single item of digital video content based upon the selection data;
   a generator to generate a data stream using the set of markers, the data stream including only the at least two non-contiguous digital video portions of the single item of digital video content, the data stream excluding each remaining portion of the single item of digital video content; and
   a transmitter to transmit the data stream as a continuous digital video stream including only the at least two non-contiguous digital video portions of the single item of digital video content, each of the remaining portions of the single item of digital video content being excluded from the continuous digital video stream.

18. The computer system of claim 17, further comprising a de-obscuring engine to de-obscure the instruction set based upon at least one of a hashing algorithm, a symmetric encryption algorithm, or an asymmetric algorithm.

19. A non-transitory machine-readable medium comprising instructions, which when implemented by one or more machines cause the one or more machines to perform the following operations:
   receiving selection data generated by a media player application, the selection data being related to at least two non-contiguous digital video portions of a single item of digital video content;
   generating an instruction set that includes the selection data the instruction set being formatted based upon a Uniform Resource Identifier (URI) schema, the instruction set including a set of markers, the set of markers identifying a range of Temporal Reference (TR) values for each of the at least two non-contiguous digital video portions of a the single item of digital video; and
   inserting the instruction set into a query portion of a single URI, the query portion of the single URI, when submitted by a viewing media player to a content store causes the content store to use the set of markers to provide only the at least two non-contiguous digital video portions of the single item of digital video content to the viewing media player in a continuous stream, the continuous stream excluding each remaining portion of the single item of digital video content.

20. The non-transitory machine-readable medium of claim 19, wherein the selection signals does not include a bookmark and includes at least one user selection of a mute function, a play function, a fast forward function, a reverse function, or a pause function.

21. The non-transitory machine-readable medium of claim 19, further comprising instructions, which when implemented by the one or more machines cause the one or more machines to-analyze the one or more selection data to determine a start time and an end time for each of the at least two non-contiguous digital video portions.

22. A non-transitory machine-readable medium comprising instructions, which when implemented by one or more machines cause the one or more machines to perform the following operations:
   receiving a single Uniform Resource Identifier (URI) associated with at least two non-contiguous digital video portions of a single item of digital video content, the single URI containing an instruction set in a query portion of the single URI;
   parsing the instruction set to retrieve selection data relating to the at least two non-contiguous digital video portions of the single item of digital video content, the selection data including the set of markers specifying a range of Temporal Reference (TR) values for each of the at least two non-contiguous digital video portions;
   retrieving the at least two non-contiguous digital video portions of the single item of digital video content based upon the selection data;
   generating a data stream including only the at least two non-contiguous digital video portions of the single item of digital video content, the data stream excluding each remaining portion of the single item of digital video content; and
   transmitting the data stream as a continuous digital video stream including only the at least two non-contiguous digital video portions of the single item of digital video content, each of the remaining portions of the single item of digital video content being excluded from the continuous digital video stream.

* * * * *